March 12, 1946.   R. T. BLAKELY   2,396,229
ACCOUNTING MACHINE
Filed March 4, 1942    8 Sheets-Sheet 1

INVENTOR.
Robert T. Blakely
BY
W. M. Wilson
ATTORNEY.

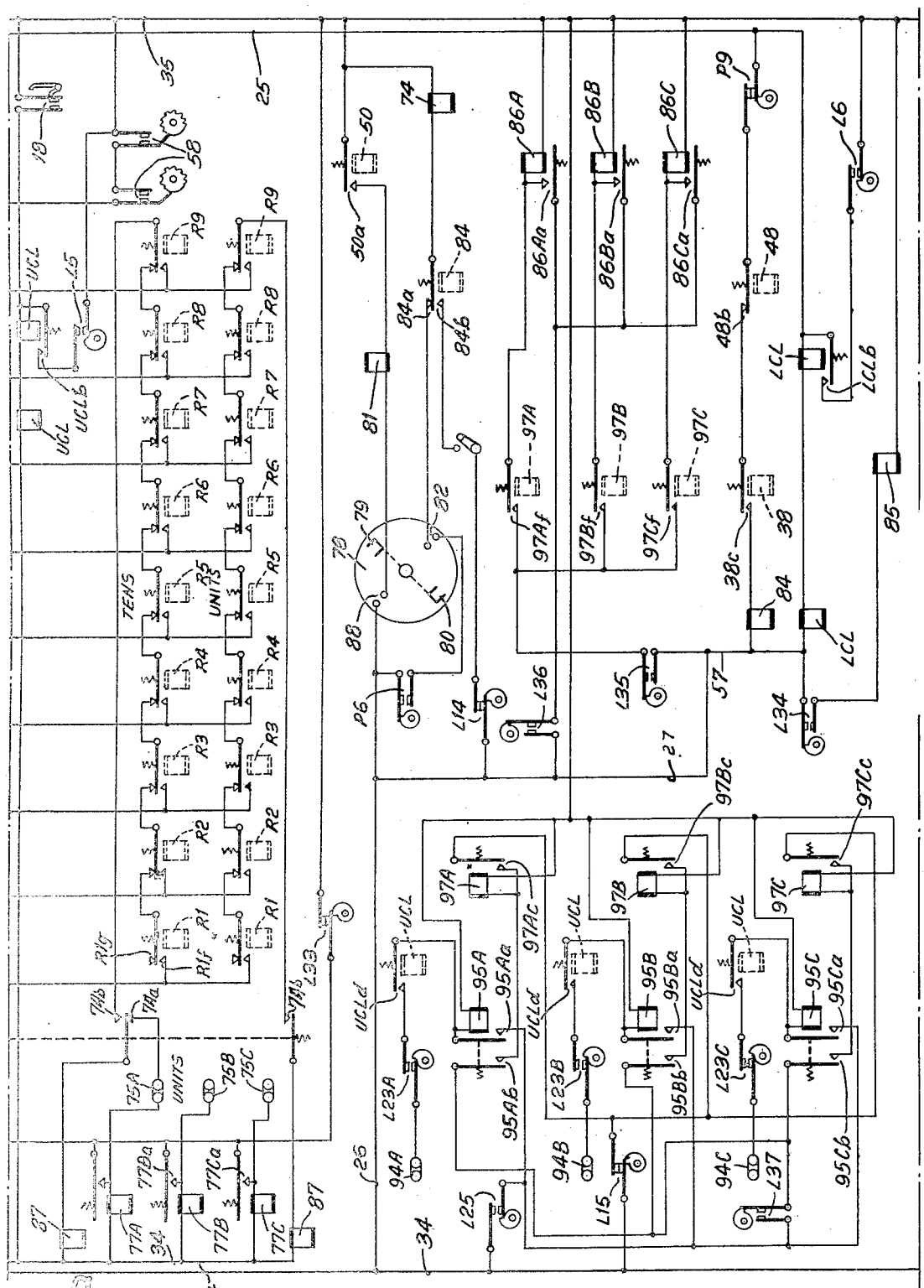

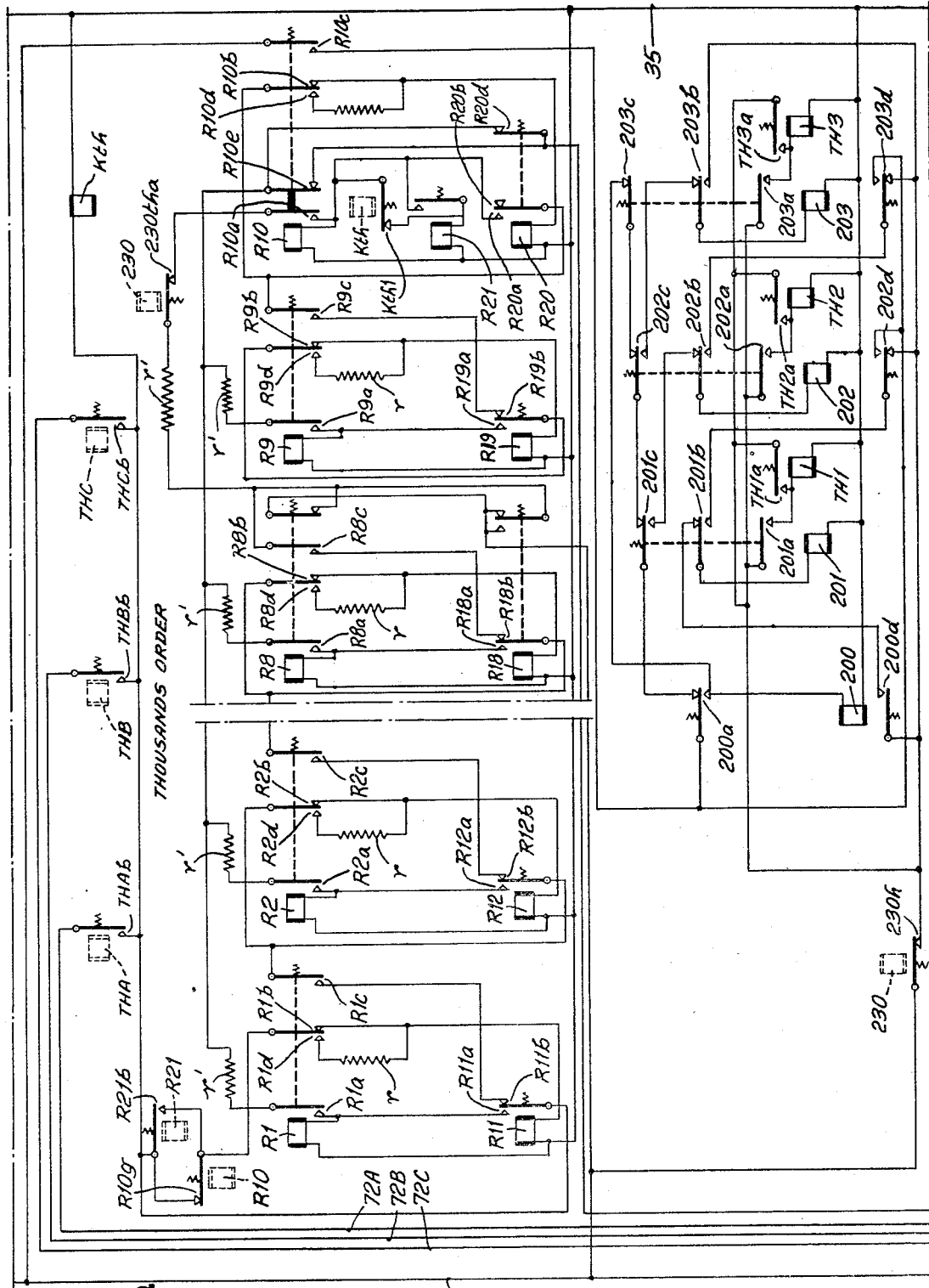

March 12, 1946. R. T. BLAKELY 2,396,229
ACCOUNTING MACHINE
Filed March 4, 1942 8 Sheets-Sheet 5

INVENTOR.
Robert T. Blakely
BY
ATTORNEY.

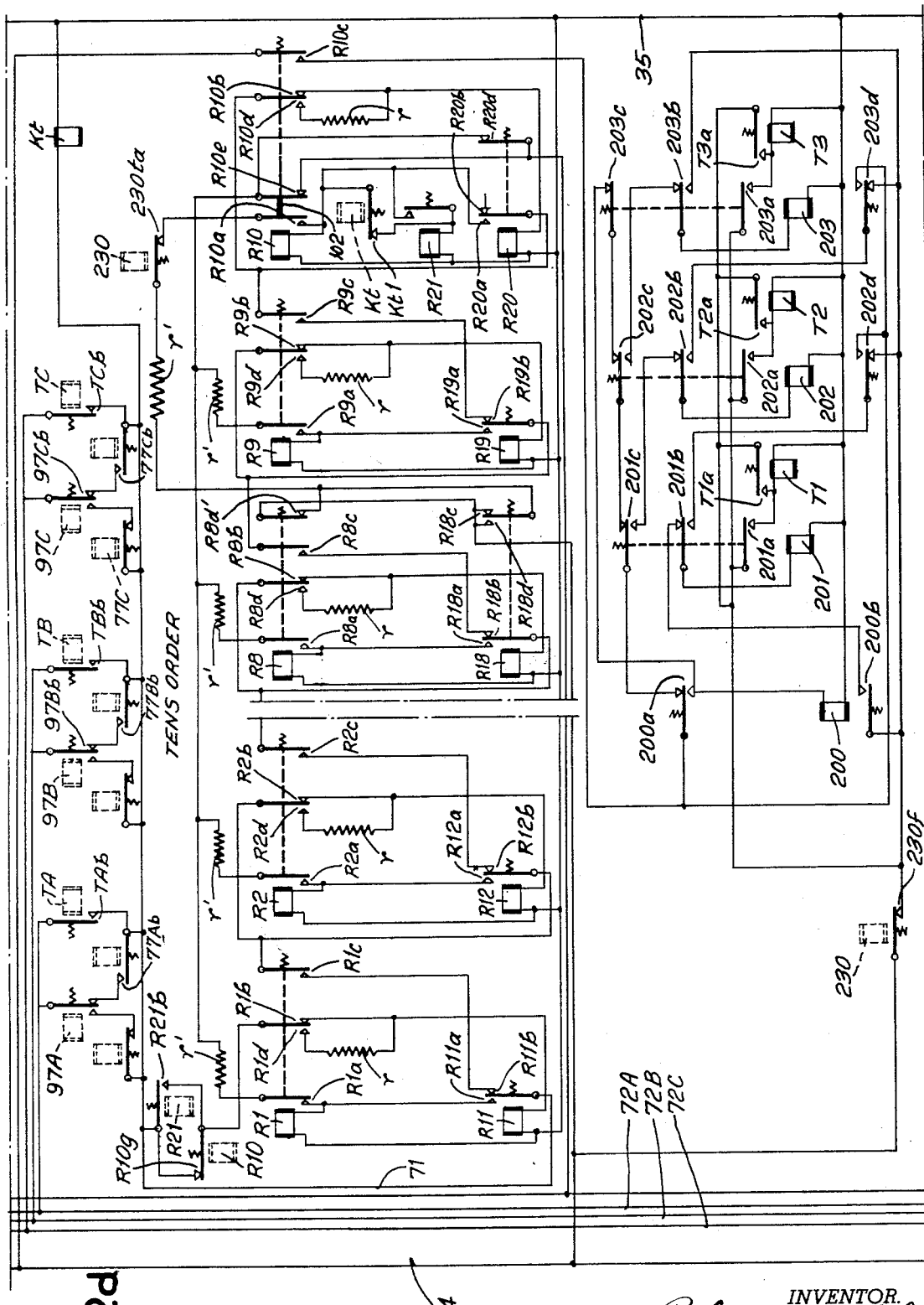

March 12, 1946. R. T. BLAKELY 2,396,229
ACCOUNTING MACHINE
Filed March 4, 1942 8 Sheets-Sheet 7

INVENTOR.
Robert T. Blakely
BY
ATTORNEY.

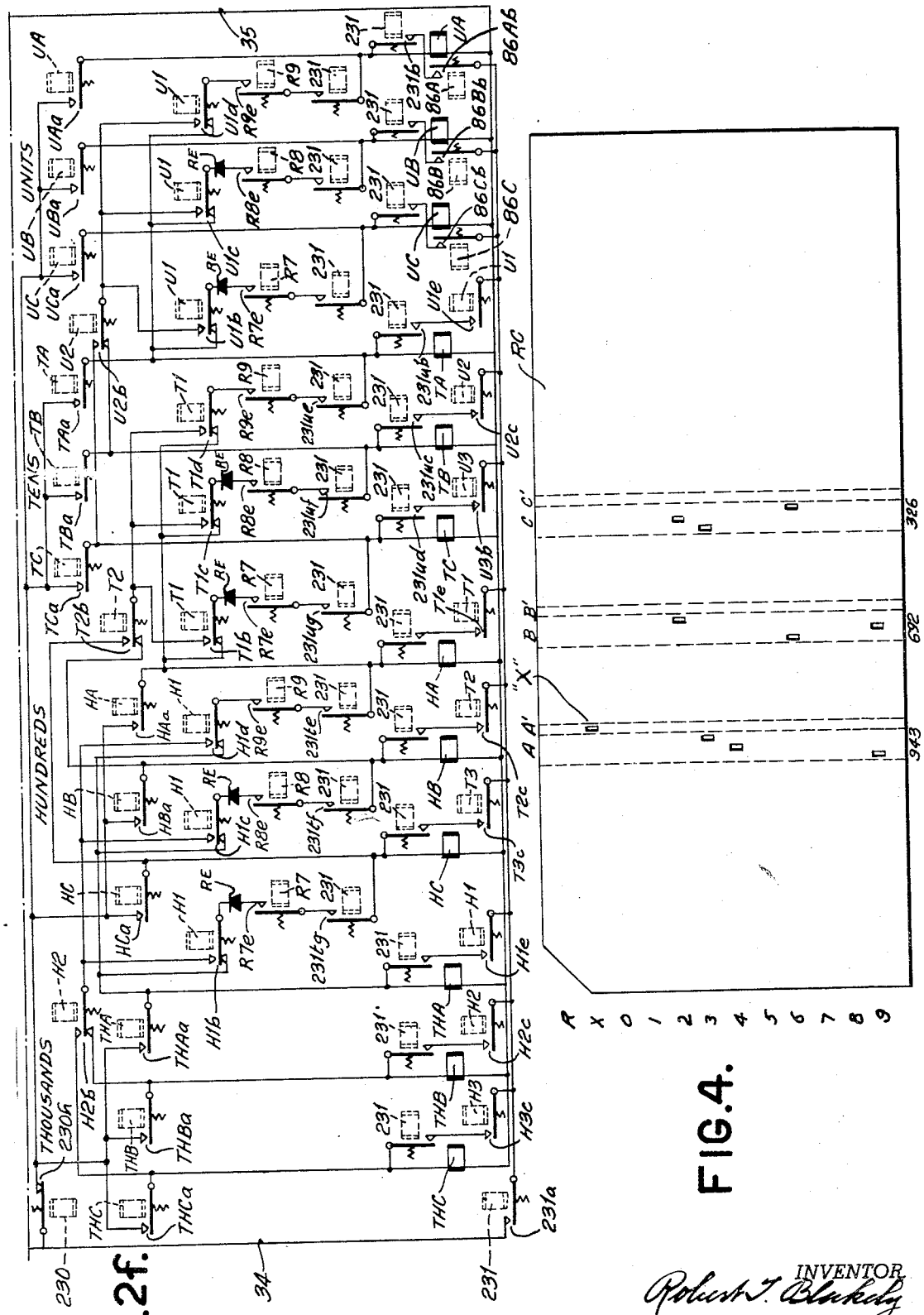

Patented Mar. 12, 1946

2,396,229

UNITED STATES PATENT OFFICE 2,396,229

ACCOUNTING MACHINE

Robert T. Blakely, Amityville, N. Y., assignor to International Business Machines Corporation, New York, N. Y., a corporation of New York Application March 4, 1942, Serial No. 433,284

11 Claims. (Cl. 235—61.6)

This invention relates to record controlled accounting machines and more particularly to value registering or accumulating mechanism used in such machines; the present application being in the nature of an improvement over U. S. patent to Lake et al., No. 1,976,617, granted October 9, 1934, and over U. S. patent to Bryce, No. 2,282,028, granted May 5, 1942.

The principal object of the present invention resides in the provision of an electric transfer mechanism of a novel form for a multiple entry accumulating device.

Another object of the present invention is in a unique means to enter a plurality of values simultaneously in a single accumulator.

A still further object is to provide a relay accumulating device of an improved form.

A still further object is to provide an accumulating mechanism operating on a greater number of impulses in a cycle than the greatest possible digit value in a record column.

An object of this invention is to provide a carry mechanism capable of retaining a plurality of carry indications to effect a plurality of carry operations later.

A further object is to provide an accumulating mechanism capable of receiving and accumulating the sum of the impulses represented by a plurality of amounts in a record cycle.

More specifically, the invention contemplates the provision of an accounting machine with accumulating means comprising pairs of relay coils for each digit value in an order. Entries for all orders are effected by routing to each order a series of impulses representative of the entry for that order. These impulses may originate from a plurality of sources. According to the invention plural impulses occurring simultaneously are converted into successively occurring impulses to effect entry and accumulation of the impulses in the accumulator.

The accumulator may be based on any notation or system and for simplicity of illustration the usual tens notation has been employed. Thus, ten pairs of relay coils for each order are provided. It is customary in record controlled machines based on a tens notation to have each card feeding cycle utilized for a single value entry into the accumulator order. This may be under control of a single impulse occurring at a differential time, or a series of impulses representing a single value. In the present invention, however, two or more primary impulses occurring at the same or different differential times are converted into a series of secondary impulses the number of which is the sum of the numbers represented by the primary impulses. Since a greater number of secondary impulses may be directed to an accumulator order during a card feeding cycle, than the number represented by the primary impulse and since the accumulator notation is based on the maximum number which may be represented by a primary impulse a novel form of carry mechanism is provided which stores an indication of the number of carrying operations which must be effected from one order to the next following an entry from the record. More specifically stated, if an accumulator order has a value of eight therein, and a primary impulse occurs from one source at nine in a cycle, and from another source at six in the cycle, the total number of secondary impulses that occur will be six plus nine or fifteen which added to the value of eight in the accumulator order gives a value of twenty-three. The three is stored in a setup of the relay pairs and the two is stored in a setup carry mechanism and at the proper time causes two additional impulses to be directed to the next higher order. The accumulator performs subtraction by the entry of a number of impulses complementary to the value of the digit to be subtracted. A simple readout means is provided and operates under the control of the last-operated relay to complete circuits to print magnets on total taking cycles.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a sectional view of the card feeding and analyzing mechanism of an accounting machine showing the essential operating parts.

Figs. 2, 2a, 2b, 2c, 2d, 2e and 2f taken together and arranged vertically in the above order comprise a representative circuit diagram of the machine.

Fig. 4 is a view showing a type of record which may be used in the machine.

Figure 3:
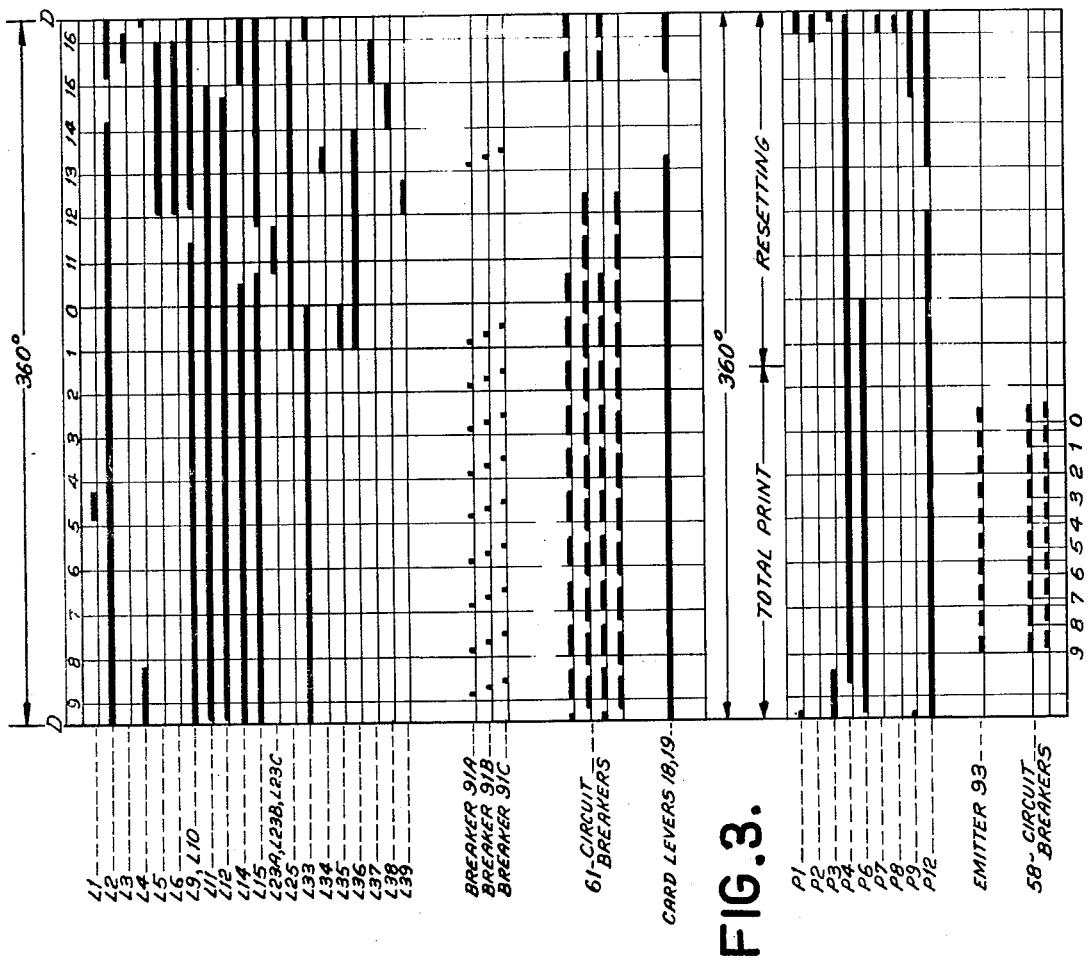
Fig. 3 shows an electrical timing chart of the machine.

For purposes of illustration, the accumulator forming the subject matter of the present invention will be described as applied to an accounting machine of the type shown in the above identified patent to Lake et al. A brief description of the card feeding and analyzing mechanism of the machine and the general machine operating circuits will now be set forth followed by a detailed description of the accumulator. If more detailed explanation of the various parts of the machine other than the accumulator is desired, reference should be made to the aforementioned Lake patent.

Card feeding and analyzing mechanism

The record cards RC (Figs. 1 and 4) are placed in a card handling section generally designated 10 from which they are fed downwardly, one by one, by a picker 11, so that the leading edge is moved into cooperation with a pair of feed rollers 12, after which the card is fed past successive pairs of feed rolls 13, 14, and 15 to a stacker (not shown).

Between pairs of feed rollers 12 and 13 are located the upper analyzing brushes UB, and between rollers 14 and 15 are located lower analyzing brushes LB. These sets of brushes cooperate with contact rolls 16 and 17 respectively. At each of the brush stations is a pivoted card lever, the one at the upper brush station cooperating with a pair of contacts 18 and the one at the lower brush station cooperating with a pair of contacts 19. The levers serve to close their respective contacts while the record card is passing the brushes and permit the contacts to open during the interval between cards.

On the first feed cycle of the machine, the leading card will be moved downwardly to a position where the leading edge of the card will have slightly passed the upper brushes UB, insulating them from the contact roll 16. During the second cycle, the card will be advanced by the feed rollers past the upper brushes to an exactly similar position with respect to the lower brushes LB, insulating them from the contact roll 17. Meanwhile, during this second cycle, a second card will have been advanced to the upper brushes so that there is now a card under the upper brushes and lower brushes. At this time both card levers are operated, and their associated contacts 18 and 19 closed. During the third cycle, the cards will pass the lower and upper brushes respectively and corresponding index point positions will be analyzed concurrently by the two sets of brushes. At the end of the third cycle, the first card will have been passed down beyond the lower brushes, the second card will have advanced into a position where its leading edge insulates the lower brushes from their contact roll 17, and a third card will have been fed into a similar position with respect to the upper brushes.

Value designations on the record cards are analyzed by the lower brushes LB which cause corresponding entries to be made into accumulators for the purpose of ascertaining totals. The upper brushes UB function in conjunction with the lower brushes LB under group control operation, which will be explained later, to allow the cards to continue to feed as long as control designations representing a group are the same on successive cards. At the end of a cycle during which the control designations analyzed by the upper and lower brushes differ, the feeding mechanism is automatically stopped. Totals for the group may then be taken from the accumulators in which entries were made.

Further explanation of the functions of the card feed and analyzing mechanism, except as set forth later in connection with a description of the circuits of the machine, is deemed unnecessary. If a more detailed description is desired, it may be obtained by referring to the aforementioned U. S. Patent No. 1,976,617.

Record card

A record card of the type shown in Fig. 4 is included herein as a part of the preferred mode of illustrating the principles of the invention. Such a card is customarily divided into a plurality of vertical columns. A column is further divided vertically into 12 spaces each allotted to a digit value or signal representation. The lowermost portion of a column is related to the digit 9. The next higher portion of the digit 8, etc., up to the tenth position from the bottom which pertains to zero. The eleventh and twelfth positions are respectively designated "X" and "R" and are used for certain control purposes. To represent a particular digit in any column, a punched hole is made in the vertical space allotted to that digit. Further several columns are usually grouped together to form a record field.

In Fig. 4, the card contains three fields A, B, and C which are punched as shown. Thus, field A has a punch in the lowermost portion of its left hand or hundreds order column to represent the digit 9. The middle or tens order column has a punch in the fourth position and the right hand or units order a punch in the three position. Thus, field A carries the number 943. Similarly, fields B and C are punched for a different number representation.

When certain cards or fields have amounts to be added and others have amounts to be subtracted, the upper brushes are employed in distinguishing one type from the other by so-called "X" selection method. In this method, provision may be made so that subtract cards or fields, for example, carry an "X" designation and the add cards or fields do not. The "X" designation may be placed in any column of the card, and is located in the eleventh or "X" position. Thus, in Fig. 4 the column A' is provided with an X designation. This indicates the A amount is to be subtracted. Upon sensing of the "X" designation by the upper brush, circuits will be established so that during the next cycle as the amount in the A field is being analyzed by the lower brushes it will be entered subtractively to the accumulator. The B and C amounts which have no "X" perforation in columns B' and C' are additively entered into the accumulator by the normal entry circuit. Thus, the algebraic sum of a plurality of amounts may be accumulated by entering the plurality of amounts concurrently and using the "X" perforation to indicate whether the entry is to be additive or subtractive.

General machine circuits

Figure 2:
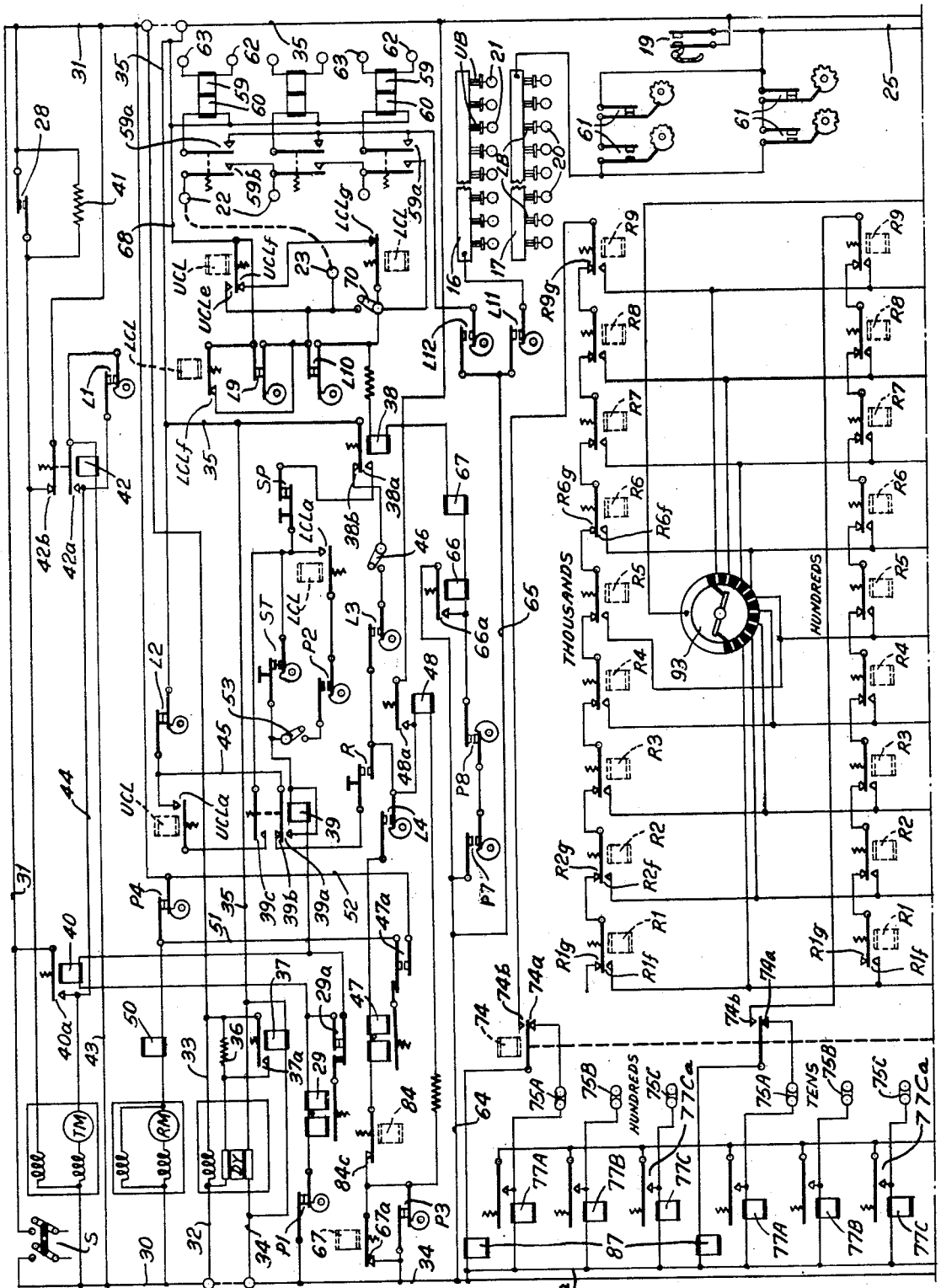

The circuits of the machine may be connected to a source of current through a switch S indicated in the upper left hand corner of Fig. 2. With the switch S closed, current is supplied to main lines 30 and 31, which through wires 32 and 33 connect these lines to the input side of a dynamotor indicated at DY. The output side of the dynamotor is connected to wires 34 and 35 which supply current to the machine proper. The use of the dynamotor DY permits the operation of the tabulating machine from a source of current whose potential is different than that for which the various electrical devices of the machine are adapted. Specifically, if the source of current is 220 volts D. C., the dynamotor, when wired as shown, will impress 110 volts D. C. on the lines 34, 35. If the supply of current is 110 volts, then, of course, the dynamotor may be dispensed with and direct connection made between lines 30 and 34 and lines 31 and 35 as indicated by dotted lines. When current is initially supplied to the dynamotor, the current through the input armature thereof will pass through a resistance 36 in parallel with which are wired contacts 37a of a relay magnet 37. Magnet 37 is directly connected across the output lines 34 and 35 of the dynamotor and its contacts close as soon as the voltage delivered is sufficient to operate the relay. Contacts 37a close to shunt out the resistance 36 and permit the full input current to be applied to the input armature of the dynamotor.

In tabulating machines of this class, it is customary to first send the machine through a preliminary cycle of operation usually termed a reset cycle to set up the automatic control mechanism and other controlling circuits. Suffice it to say at the present time, however, that during this cycle, motor control relay magnet 38 (Fig. 2) is energized and a holding circuit provided for maintaining it energized until a change occurs. Contacts 38a of this relay will, therefore, be closed and the contacts 38b opened.

Figure 1:
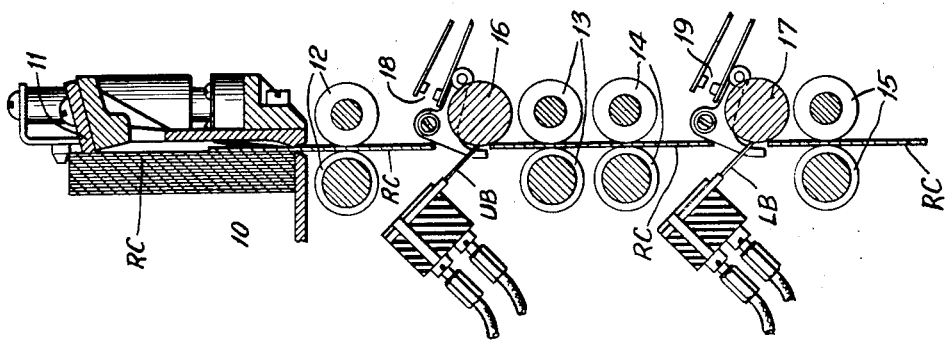

The machine is now ready to start card feeding operations after cards have been placed in the feed magazine 10 (Fig. 1). Depression of the start key ST (Fig. 2) to close contacts ST will complete a circuit as follows: from line 34, closed cam contacts P1, tabulating clutch magnet 29, contacts 29a, start relay 39, start key contacts ST, stop key contacts SP, closed relay contacts 38a, to line 35. Energization of magnet 29 causes opening of the contacts 29a and the circuit will now include relay magnet 40, which is wired in parallel with the contacts 29a.

Magnet 40 will close its contacts 40a to complete a circuit through the tabulating motor TM as follows: from line 30, motor TM, contacts 40a, to line 31, thus initiating the operation of the motor. Motor TM is of the two-speed type having a resistance 41 connected in series with its field winding. Shunted across resistance 41 are the contacts 28 which may be arbitrarily closed to shunt out the resistance 41 and cause the motor TM to operate at a slow speed. A further pair of contacts 42b are connected in parallel with resistance 41 and contacts 28 and are controlled by a relay magnet 42. The object of the contacts 42b is to shunt out the resistance 41 at the start to insure starting of the motor at its slow speed. After the machine has operated through a portion of a cycle, cam contacts L1 (see also Fig. 3) close momentarily and complete a circuit from line 30 (Fig. 2) wire 43, relay magnet 42, contacts L1, wire 44, contacts 40a, to line 31. The consequent closure of contacts 42a will set up a holding circuit for the magnet 42 traceable from line 30, wire 43, magnet 42, contacts 42a, wire 44, contacts 40a, to line 31. Energization of magnet 42 will, of course, open contacts 42b, permitting the inclusion of resistance 41 in the field circuit of motor TM, if the machine is set for tabulating operations.

Inspection of the timing diagram (Fig. 3) will show that the time of closure of contacts L1 occurs after the machine has turned through substantially a third of a cycle so that it will be apparent that operation of the machine for this portion of the cycle will be at the slow speed, regardless of whether contacts 28 have been set open or closed. During the first cycle, the record card C is advanced from the supply magazine to a position where its leading edge is in contact with the upper brushes UB (see Fig. 1), as previously explained.

Energization of the start relay magnet 39 will effect closure of its contacts 39a to set up a holding circuit for the clutch magnet 29 traceable from line 34, cam contacts P1, magnet 29, relay 40, magnet 39, contacts 39a, wire 45, cam contacts L2 to line 35. Toward the end of this cycle cam contacts L2 break, as indicated in the timing diagram (Fig. 3), and the machine will coast through the remainder of the cycle to home position, which will hereinafter be termed the D position, as it is commonly known in the art.

A second machine cycle is now again initiated by depression of the start key to close contacts ST and a second cycle will follow in the same manner as the first. During this second cycle, the first card is advanced to the lower brushes and a second card is fed from the supply magazine. Following this second cycle, the machine may do one of two things. If the automatic resetting switch 46 is open, the machine will stop as before and if the switch is closed, the machine will automatically enter upon a resetting cycle of operations. If the machine stops, the same resetting cycle is initiated by depression of the reset key to close contacts R. It will be pointed out in connection with the group control circuits that the motor control relay 38 is deenergized during the second tabulating cycle just mentioned, so that contacts 38a open and 38b close during the latter part of the cycle.

If switch 46 is closed, the closure of cam contacts L3 toward the end of the second cycle will complete a circuit traceable as follows: from line 35, contacts 38b, switch 46, now closed, cam contacts L3, relay magnet 48, cam contacts P3, to line 34. Closure of contacts 48a will set up a holding circuit for magnet 48 traceable from line 34, contacts P3, magnet 48, contacts 48a, to line 35. At the very end of the cycle, contacts L4 close, permitting the completion of a circuit from line 35, contacts 48a, contacts L4, reset clutch magnet 47, contacts 84c, contacts P3 to line 34. The contacts 84c are controlled by a multi-contact relay magnet 84 (Fig. 2a) which is energized through a circuit extending from line 34, wires 26 and 27, magnet 84, relay contacts 38c, contacts 48b, cam contacts P9, wire 25 (see also Fig. 2), card lever contacts 19, now closed, to line 35. The contacts 38c are controlled by the motor control magnet 38 and are opened when magnet 38 is deenergized due to a change in the group control number, in a manner to be explained. Contacts 48b are opened by the magnet 48 when the latter is energized to initiate a resetting cycle of operations. It is thus apparent that if either of the contacts 38c and 48b are open, magnet 84 is deenergized to permit closing of contacts 84c in the reset clutch magnet circuit. It is thus apparent that during card feeding cycles, contacts 84c are held open and prevent completion of the reset clutch magnet circuit. Magnet 47 will trip the reset clutch mechanism and will cause the closure of the contacts 47a.

This will permit completion of the circuit through the reset motor RM which is traceable from line 30, motor RM, magnet 50, wire 51, contacts 47a, wire 52, to line 31. The motor RM will thereupon operate to drive the machine through a reset cycle during which contacts P4 close to short circuit the contacts 47a and maintain the circuit through motor RM. Later, contacts P3 open and the holding circuit of magnet 48 is broken when contacts 67a open. Cam contacts P4 open at the very end of the cycle to break the circuit through the motor RM.

If the machine had stopped after the second tabulating cycle, due to the open position of switch 46, the resetting cycle is initiated by depression of the reset key to close contacts R, which completes a circuit from line 35, contacts L2, wire 45, contacts 39b, contacts R, relay 48, contacts P3, to line 34. Energization of magnet 48 controls the completion of the above traced circuits through reset clutch magnet 47 and the subsequent completion of the circuit through the reset motor RM.

It has thus far been explained that the initiation of operations of the machine require a first resetting operation, followed by two successively manually initiated tabulating cycles, followed by a resetting cycle which is either manually or automatically initiated. At this point, the first card is in readiness to pass and be analyzed by the lower brushes LB and the second card is in readiness to pass and be analyzed by the upper brushes UB and the automatic control mechanism is in readiness to compare the control designation of the cards as they pass through the machine. Following the reset cycle just explained, the machine will stop, if the automatic start switch 53 is open, and further operations of the machine will be initiated by depression of the start key to close contacts ST. If switch 53 had been previously closed, however, the machine will automatically enter upon card feeding and analyzing operations immediately upon completion of the last resetting cycle. This is brought about in the following manner: When the first card arrives at the lower brushes, closure of lower card lever contacts 19 completes a circuit from line 35 (Fig. 2), contacts 19, wire 25 (see also Fig. 2a), a number of relay magnets LCL, wire 57, to line 34. A number of magnets LCL are provided to distribute the multiplicity of contacts to be controlled. Closure of relay contacts LCLb will complete a holding circuit for relays LCL through cam contacts L6. This circuit is from line 35, contacts L6, contacts LCLb, magnets LCL and wires 57, 27 and 26 to line 34. As long as record cards continue to pass the lower brushes, magnets LCL will remain continuously energized since contacts L6 are timed to be closed during the interval that the card lever contacts 19 open (see the timing chart, Fig. 3). The upper card lever contacts 18 (Fig. 2a) similarly complete a circuit from line 35, contacts 18, magnets UCL, wire 57a, to line 34. The closure of contacts UCLb sets up a holding circuit through cam contacts L5, whose function and timing is the same as that of contacts L6.

Relay contacts LCLa will accordingly have been closed and during the reset cycle previously traced, cam contacts P2 closed momentarily at the end of the cycle, thereby establishing a circuit from line 35, contacts 38a, now closed, contacts SP, LCLa and P2, switch 53, start relay magnet 39, contacts 29a, tabulating clutch magnet 29, contacts P1, to line 34. The energization of magnet 29 will, as explained above, cause the machine to enter upon a tabulating cycle of operations, during which the record cards are successively analyzed and the amounts thereon entered into the accumulators.

The automatic control circuits which keep the machine in operation as long as control designations on successively analyzed cards are the same will now be explained.

A number of double-wound relay magnets are provided (Fig. 2), each having a pick-up winding 59 and a holding winding 60. Windings 59 terminate in the jacks 62 and 63 through which the windings may be plug connected in series with the brushes UB and LB. Since the index point positions on the card passing the lower brushes are analyzed concurrently with the analysis of the corresponding index point positions of the following card passing the upper brushes, a perforation occurring in any index point position of both cards will complete a circuit at a time in the cycle of the machine corresponding to the location of the perforation.

The control pickup circuit is traceable as follows: from line 34 (Fig. 2), wires 64 and 65, cam contacts L11, upper brush contact roller 16, designation on the card at the upper brushes, upper brush UB, plug socket 21, plug wire connection to jack 63, winding 59, jack 62, plug wire connection to jack 20, brush LB, designations in the card at the lower brushes, lower brush contact roller 17, circuit breaking contacts 61, lower card lever contacts 19 to line 35.

Energization of winding 59 will close its contacts 59a and 59b, the former setting up a holding circuit for the windings which is traceable as follows: from line 34, wires 64 and 65, cam contacts L12, contacts 59a, winding 60, to line 35. Contacts L12 hold the windings 60 energized until nearly the end of the cycle. It is thus apparent that the windings 59 are energized at a differential time in accordance with the value of the controlling perforation and that the windings 60 hold all the selected circuits to keep contacts 59b closed in positions in which agreement occurred between the cards.

In the machine there are generally provided sixteen sets of windings 59, 60. On the circuit diagram, however, only three are shown, to avoid undue repetition of similar parts. After all the index point positions have been analyzed, the machine tests the setting of the contacts 59b. If there was agreement in all the control columns, the contacts 59b corresponding to those columns will be closed and a series circuit will be traceable through each such contact. The contacts associated with the controlling field of the record card will be grouped together and a plug wire connection made between the jack 22 of the last position into jack 23. This places the contacts 59b (Fig. 2) in the holding circuit of magnet 38 when contacts L9, L10 open. The ultimate object of the group control mechanism is to keep the motor control relay magnet 38 energized, if there is agreement in the control field and to cause deenergization of magnet 38, if there is a break or disagreement in the control field.

Magnet 38 is normally held energized through a circuit set up during the initial resetting cycle of the machine. During this cycle, cam contacts P7, P8 close at substantially the same time one being set for an accurate make and the other for an accurate break of the circuit. The circuit will be completed from the line 34, wire 64, contacts P7, contacts P8, control relay magnet 66, magnet 67, motor control relay magnet 38, cam contacts L9 and L10, wire 68, to right side of line 35. Control relay 66 closes its contacts 66a to establish a holding circuit from line 34, wire 64, contacts 66a, magnet 66 to line 35 as before. This circuit is the control holding circuit and remains energized as long as there is no group change.

While cards of a group are feeding, the contacts 59b provide a shunt circuit around contacts L10.

For example, the contacts 59b, when they are closed and when plug connection between jacks 22 and 23 is made, as shown dotted, short circuit contacts L10, the short circuit running from the lower blade of contacts L10 to the lowermost contacts 59b, then to the uppermost pair, plug connection from jack 22 to 23, to the upper blade of contacts L10.

Thus, the control relays have registered agreement between the two cards analyzed, then at the time contacts L10 open the holding circuit is sustained through the contacts 59b. If, at such time one of the contacts 59b had failed to close, the holding circuit would have been broken, deenergizing relay magnets 66, 67 and the motor control relay 38, causing stoppage of the machine or automatic entry upon a total taking and resetting cycle.

During the subsequent total taking cycles, closure of cam contacts P7 and P8 will again establish the holding circuit and comparison of the successively fed record cards of the next group will take place and card feeding will proceed until there is again a break in either of the circuits.

It may here be mentioned that with the automatic reset switch 46 closed, the machine will perform a single cycle of total taking operations and the group control holding circuit will be concurrently reestablished during this single cycle.

A switch 70 is provided, which, when closed, permanently short circuits contact L10. If this switch is closed, the control mechanism is inoperative and the holding circuit remains established indefinitely. Various contact devices are included in this control mechanism to delay its functioning until cards have been advanced into the machine in readiness for actual comparison with one another. These devices may be best explained by examining the several starting cycles of the machine.

The very first cycle, which is the manually initiated reset cycle, operates contacts P7 and P8 to initially establish the control holding circuit and energize motor control relay 38 so that the starting circuit can be completed. At this time, the lower card lever relay magnets LCL are deenergized as are also the upper card lever relay magnets UCL and their respective contacts LCLg and UCLf short circuit contacts L10 so that during the first card feeding cycle, the opening of contacts L10 is ineffective to break the holding circuit. At the end of this cycle, however, the upper card lever contacts 18 close, causing energization of upper card lever relay magnets UCL and opening of contacts UCLf. As explained above, the machine comes to rest after this first card feeding cycle with the first card about to pass the upper brushes. A second manually initiated cycle then takes place.

During the second card cycle, none of the contacts 59b can be closed since the lower brushes LB, which receive current through the lower card lever contacts 19 do not receive current. Opening of contacts L10 therefore finds no holding circuit for the control relay magnet and the same is therefore interrupted. At this time, the leading card will be at the lower brushes after having closed card lever contacts 19 to supply current to the lower brushes and to cause energization of lower card lever relay magnets LCL, opening the contacts LCLg. The following total taking and resetting cycle will again set up the holding circuits and the machine will proceed with its tabulating operations under the joint control of the contacts L10 and contacts 59b.

When the last card in the machine has passed the upper brushes and is passing the lower, and the upper brushes are making contact on the bare contact roller 16, inspection of the circuit diagram (Fig. 2) will show that circuits will be completed to all the active relays in the same manner as though another card of the same group were passing the upper brushes. This, of course, would indicate an agreement and the group control would not break until the lower card lever contacts opened. Therefore, it is necessary at this time to break the control holding circuit even though the shunt circuit through contacts 59b is closed. This is brought about under control of the upper card lever contacts which open, since no card is at the upper brushes, bringing about the deenergization of the upper card lever relay magnets UCL and permitting opening of contacts UCLe. No shunt circuit can now be established through the contacts 59b so that when the contacts of L10 open the holding circuit will be broken, and the machine will enter upon total taking operations.

*Accumulating mechanism—General*

The accumulating mechanism is composed entirely of relay coils, associated contacts and certain circuit controlling devices. For each denominational order of the accumulator exclusive of carry mechanism, twenty-one relays are provided, two for each digit except the zero digit position which requires three relays for reasons described later. The relays are connected by electrical circuits so as to form a series of sets of relays. Each set comprises a value-corresponding relay paired with a controlling relay and represents an ordinal value or digit position.

Figure 2C:
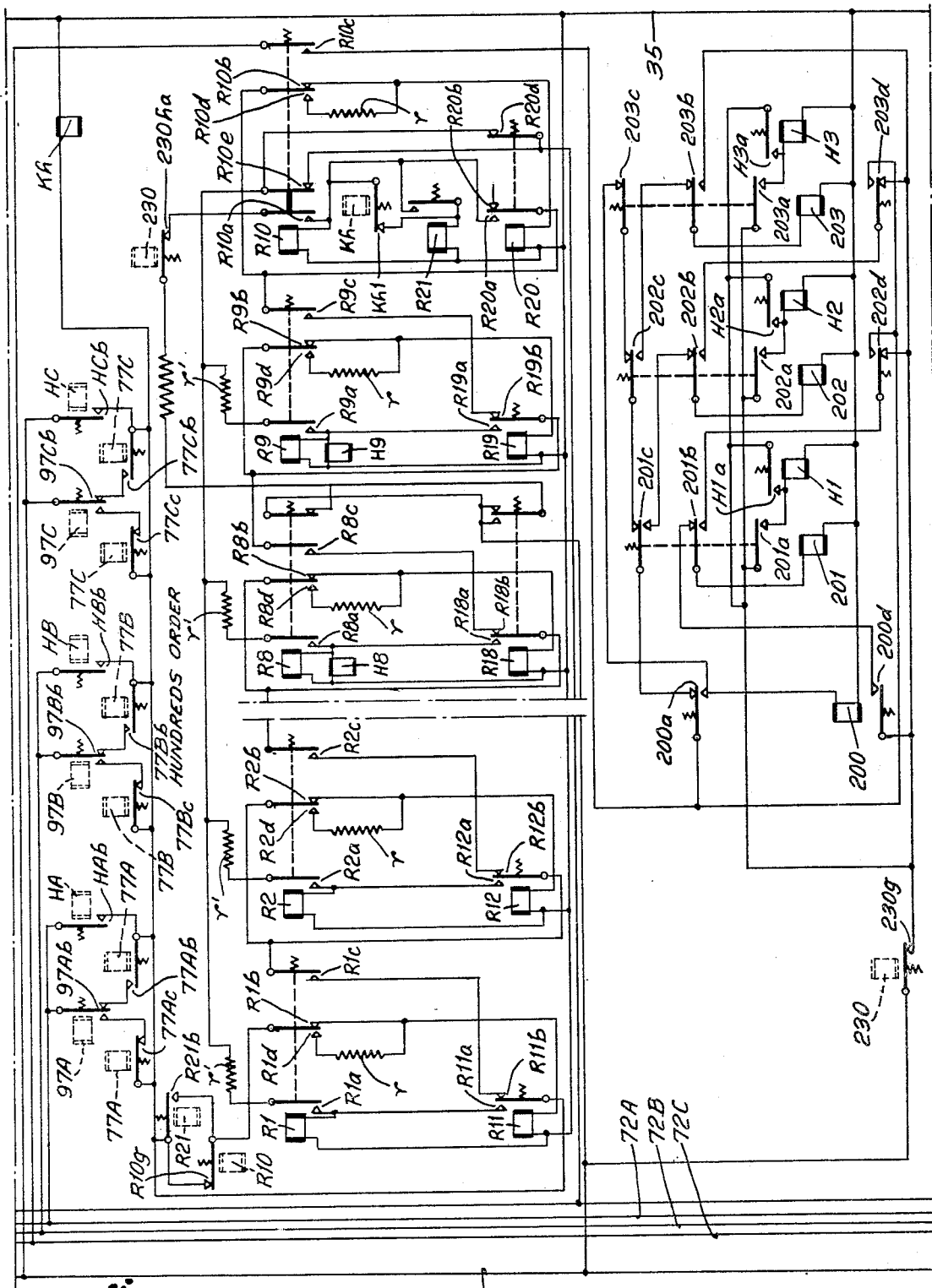
Figure 2E:
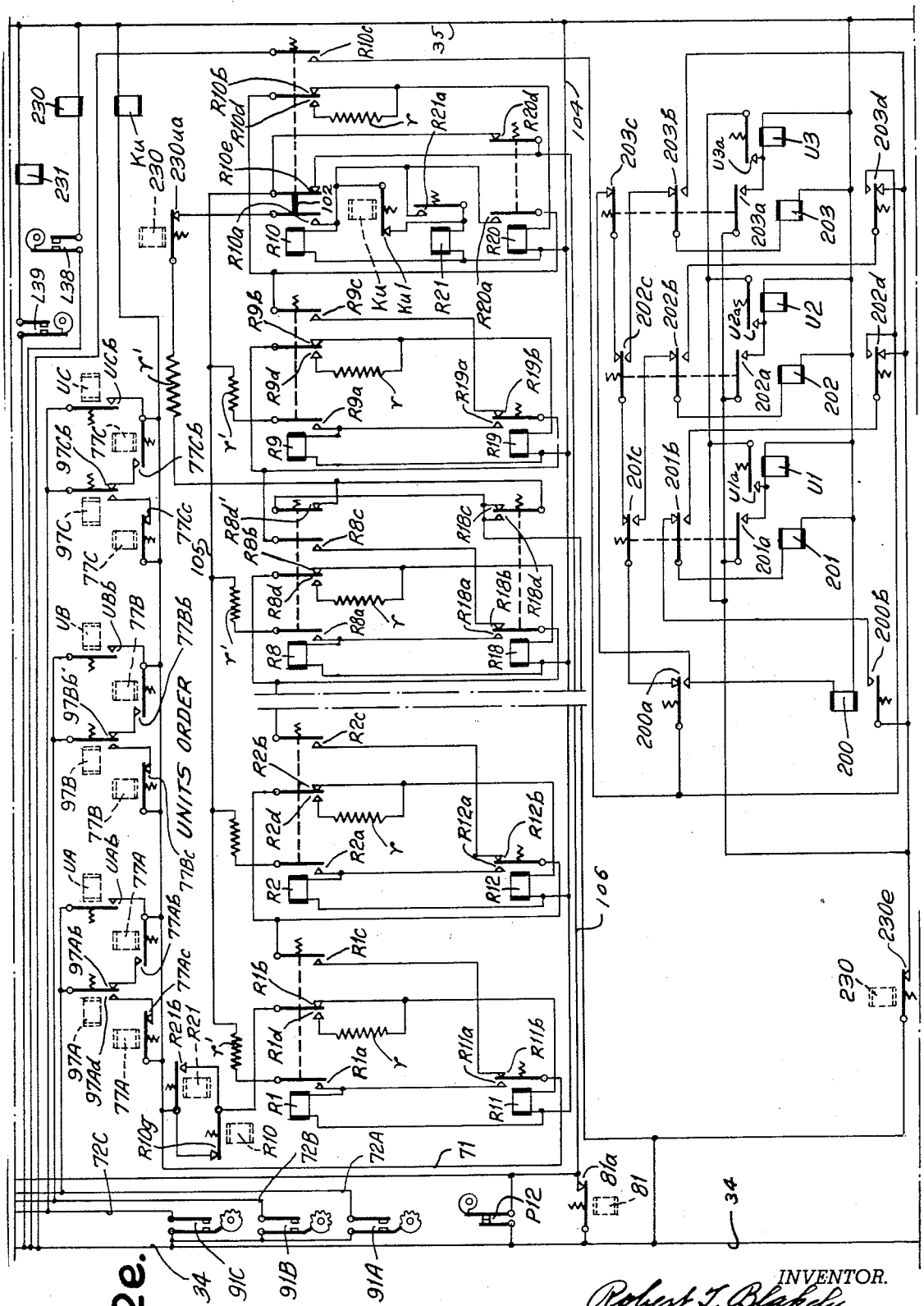

In the circuit diagram of the machine (Figs. 2, 2a, 2b, 2c, 2d, 2e and 2f) four denominational orders of the accumulator are shown for purposes of illustration. These orders are designated as the units, tens, hundreds, and thousands orders. The relay arrangement in each of the orders is similar, so that the structure of the units order as set forth in Fig. 2e is representative of the structure in the others.

In order to condition the accumulator for adding, certain circuits are completed as the first card passes the lower brushes. Certain of relay coils 77A, 77B, or 77C (see Fig. 2) will be energized under control from the record card in a manner which will be described shortly. Energization of the last mentioned relay coils will close contacts such as 77Ab, 77Bb or 77Cb (see Fig. 2e). Closure of these contacts will complete circuits which provide a plurality of successive circuit or impulse connections representative of the amounts to be added. These connections are to line 71 from line 34. The method of completing these circuits and the manner in which the number of successive connections made relates back to the amounts to be added, will be set forth shortly. To understand the principles of the accumulator, it is only necessary to know that a number of successive connections are made between line 34 and line 71 during adding operations. It may be further mentioned that these successive connections are made during the differential index points of a cycle and that for each amount being added one connection will be made per index point, the number of these connections corresponding to the magnitude of the amount in the column. Thus, for two entries made simultaneously there will be two connections made for each index point until the number of connections made is equal to the sum of the two numbers. If for example, the digit 7 is entered simultaneously from two fields of a record, described later, then fourteen separate connections will be made during the next seven index points.

*Impulse circuits*

Previous to starting the machine certain plug connections for effecting entry are made. Assuming three amounts A, B, and C are being derived from three fields of a record, a plug connection will be made from plug socket 20 (Fig. 2) which connects to the brush LB analyzing the units column of the "A" amount to "units" plug socket 75A (Fig. 2a) which connects to relay coil 77A for the units order. A plug connection will be made from socket 20 connected to the brush LB analyzing the units column of the "B" amount to "units" plug socket 75B which is connected to relay coil 77B. A further plug connection will be made from socket 20 corresponding to the units column of the "C" amount to "units" plug socket 75C connected to relay coil 77C. Similar connections are made from the plug sockets 20 to sockets 75A, B and C of the tens and hundreds orders. Assume a card bearing amounts A=25, B=73, and C=98, passes by the lower brushes. At the ninth index point a circuit will be completed from line 35, through card lever contacts 19, circuits breakers 81, contact roll 17, nine hole in the "C" field of the card, brush LB analyzing the nine perforation in the tens column of the "C" amount, plug socket 20, plug connection to socket 75C in the tens order, relay coil 77C of that order and back to line 34. At the eighth index point a similar circuit is completed to energize relay coil 77C of the units order. Energization of coils 77C (units) and 77C (tens), close their contacts 77Ca to maintain a holding circuit through cam contacts L33, see Fig. 2a, until the zero index point of the cycle. In a like manner, relay coil 77A in the tens and 77A in the units orders will be energized at index points, two and five respectively, and relay coil 77B in the tens and 77B in the units orders will be energized at index points seven and three respectively. The manner in which these differential energizations of coils 77A, 77B, and 77C for the various orders cause successive impulse circuits to be completed in the various accumulator orders will now be explained. Considering the units order first, energization of relay coil 77C for the units order at the eight index point closes contacts 77Cb (Fig. 2e). This permits a circuit to be completed from line 71, relay contacts 77Cb, relay contacts 91Cb in the position shown, line 72C, cam contacts 91C to line 34 every time cam contacts 91C close. These will close eight times before relay contacts 77Cb open upon deenergization of relay coil 77C for the units order. It will be described later, how each time this circuit is completed an entry of one is effected into the units orders. For the "B" amount the relay contacts 77Bb of the units order will close at three in the cycle. This will permit a circuit to be completed from line 71, relay contacts 77Bb, contacts 91Bb in the position shown, line 72B, circuit breaker 91B to line 34. These will close three times before relay contacts 77Bb open. Similarly for the A amount contacts 77Ab close at five and permit the circuit between lines 71 and 34 to be made five times before relay contacts 77Ab open for the units order. By referring to the timing diagram Fig. 3, it may be seen that the closure time of circuit breaker contacts 91A, 91B, and 91C is offset so that the circuit paths completed by these contacts described above, occur at different times and thus the number of times the circuit is made is the sum of all entries made in that particular column. Thus, in the units column as just described five closures for A, three for B, and eight for C represent a total of 16 closures which, as will be later described, enters 16 into the accumulator through the units column and its transfer mechanism. Similarly for the tens column closure of relay contacts 77Ab, 77Bb, and 77Cb, in the tens order will permit eighteen separate circuit connections to be made between line 34 and line 71 in the tens order, Fig. 2d. Eighteen connections represent the sum of 2, 7, and 9 in the tens column of fields A, B, and C respectively, on the record card. To summarize it has been shown how the concurrent entry of a plurality of fields on the record card completes a number entry circuit into each order of the accumulator a number of times equal to the sum of all the values derived from the record for that particular order. These circuits may also be termed impulse circuits.

*Accumulation*

First considering entry into the units order of the accumulator (Fig. 2e) an entry from the record card will cause the first circuit connection to be made from line side 34 to line 71. The circuit then continues through contacts R10g, value relay contacts R1b, entry control relay coil R11, via conductor 104, to line 35, thus energizing the control relay R11. Contacts R11a will close and thereby establish a circuit to energize value relay R1 from line 34, through the circuit or impulse connection, to line 71, contacts R11a now closed, relay coil R1, to line 104 and back to line 35. Relays R11 and R1 are successively energized by the same impulse. With relay R1 energized, contacts R1a will close and provide a holding circuit from line 35, via wire 104, to relay coil R1, contacts R1a, now closed, resistance r', via wire 105, to contacts R10e or R20d, conductor 106, relay contacts 81a or cam contacts P12 to line 34.

Upon the energization of the value relay R1, the R1d contacts also close. These contacts are of the type known as "make before break" contacts; that is, contacts R1d will become closed before the normally closed contacts R1b open. Thus, when the 1d contacts close, relay R11 is momentarily maintained energized by the circuit which was described for its initial energization. The circuit is slightly altered now, however, by the fact that a resistance r has been brought into the circuit in series with relay coil R11, and the circuit now passes through contacts R1d instead of contacts R1b.

Resistance r is of such a value that it will allow the entry control relay R11 to remain energized and keep contacts R11a closed until the circuit connection opens at the end of the impulse, at which time, relay coil R11 is deenergized. Upon the next circuit connection, resistance r limits the flow of current through coil R11 to a value below that necessary to re-close contacts R11a. So long as resistance r is in series with the now deenergized R11 coil the contacts controlled by this coil will remain in their normal positions.

Another resistance, designated r', is provided in the holding circuit for relay R1 to prevent a potential holding circuit for the R11 relay coil that would otherwise be established upon the closure of contacts R1a. This potential circuit may be traced as follows: line 35, conductor 104, relay coil R11, resistance r, contacts R1d, now closed, contacts R10g, contact R11a also closed, and then to line 34, through the remainder of the holding circuit for the R1 relay as previously described. The resistance r', however, being in series with the circuit just described is of such value that, when combined with resistance r will limit the holding current to relay coil R11 and, at the time circuit connection is broken after the first impulse, the relay R11 will be deenergized causing its contacts to be restored to normal.

For illustrative purposes, a specific entry into the units order will now be described. Assume, for example, that an entry of "5" is to be made by five successive circuit connections. The action of the first impulse has already been described. The second impulse to enter the accumulator is next made by a circuit connection from line 34 to line 71, contacts R11b in the position shown, contacts R1c now closed, contacts R2b in the position shown, relay coil R12, to line 35. Relay R12 is thus energized and closes its contacts R12a to provide a circuit to energize value relay R2 in a manner similar to that described for the energization of value relay R1. Coil R12 will become deenergized when the circuit connection to this coil is opened.

It is apparent from the foregoing explanation that each additional impulse entering the accumulator units order causes the energization of the new value relay, that is, the first impulse caused the energization of relay R1, and the second impulse, relay R2, etc. Such energization of relay R2 was dependent upon the fact that relay R1 remained energized, its R1c contacts being in series with the circuits which energize relay R12 and then relay R2. In like manner, when a third impulse enters the units order, it passes through contacts R1c and R2c now closed and results in the energization of a relay R3 in a manner similar to that described for the previous value relays in the series. Thus, at the end of a fifth impulse, relays R1 to R5 would be energized to represent that "5" had been entered into the units order of the accumulator. The operation of the series of relays for the first impulses entered is the same as described above, and thus at the end of the ninth impulse, relays R1 to R9 remain energized. These relays are maintained energized by a circuit through the normally closed R10e or R20d contacts as previously explained. Upon entry of a tenth impulse, however, a somewhat different series of events occur. A circuit to energize entry control relay R20 is provided as follows: line 34, to line 71 as described above, contacts R11b, contacts R1c, contacts R12b, contacts R2c, contacts R13b, R3c, etc., to and through contacts R9c, contacts R10b, relay coil R20, to line 35. Relay R20, upon being energized, causes contacts R20a to close and a circuit is thereby completed to the zero value relay designated R10. This circuit is as previously traced through contacts R11b, R1c, R12b, R2c, etc., through contacts R9c, contacts R20a, now closed, relay coil R10, to line 35. Contacts R20d, which are in parallel with the R10e contacts, are now opened. Contacts R10a and R10e are of the make before break type and are tied together by means of an insulating portion 102. That is, contacts R10a are designed to close before contacts R10e open. Therefore, upon energization of relay R10, contacts R10a will close, providing a holding circuit for relay R10 from line 35, through relay coil R10, contacts R10a, contacts 230ua, resistance r', contacts R18c to line 34. After contacts R10a have closed, contacts R10e will open and since contacts R20d are already open as previously described, the holding circuit for the value relays R1 through R9 is now broken, and their contacts are returned to their normal position.

Contacts R20d are placed in the circuit to bypass the R10e contacts for the purpose of reestablishing the holding circuit for relays R1 through R9 immediately after it is broken by the opening of the R10e contacts. The deenergization of relay R20 upon the deenergization of relays R1—R9 allows contacts R20d to close and perform their function as described, so that after the next impulse and succeeding impulses, the value relays successively energized by these impulses will have a holding circuit to maintain them energized in a manner already described. Contacts R10e are held open by the energized R10 relay for an appreciable time and when the next impulse enters the accumulator to energize the R1 relay they would not allow a maintaining circuit for this relay to be established, except for the presence of the R20d contacts which complete the circuit in time to take care of this condition.

The reenergization of relays R11 and R1 from the tenth impulse must be prevented. This condition would be likely to occur just after the R20d contacts had reestablished the holding circuit for relays R1 to R9, except for the fact that contacts R10g are provided. As soon as relay R10 became energized, contacts R10g opened and prevented the completion of an entry circuit to energize relays R11 and R1. It will be noted a relay Ku is also provided and connected from line 71 to line 35. Each impulse connection of line 34 to the line 71 will cause the Ku relay to be energized by a circuit from line 34 to line 71 through relay Ku and back to line 35. Once relay Ku is deenergized, following the opening of contacts R10e, and completion of the last impulse connection, the entry circuit for energizing the accumulator relays may be reestablished. This is brought about by the closing of contacts R21b in the following manner: with relay R10 energized, when contacts Ku1 reclose, the relay R21 will be connected in parallel with relay R10 and also become energized. At the time relays Ku and R20 were first energized, the relay R21 could not pick up because the contacts Ku1 are adjusted to open before the contacts R20a close, to allow a circuit to be completed to the R10 relay. Relay R21 remains energized until relay R10 becomes deenergized. This condition is obtained by the shunt circuit provided around the Ku1 contacts by contacts R21a.

It would now be well to summarize briefly the sequence of events which occur upon the entry of a tenth impulse into an order of the accumulator. Relays R1 to R9 will have been energized prior to the tenth impulse. Upon entry of the tenth impulse, relays Ku and R20 are energized concurrently, but the Ku1 contacts open before R20a contacts close and relay R10 is energized. The energization of relay R10 drops the relays R1 to R9. R20 is deenergized when the tenth impulse ends, and thereby closes the contacts R20d to permit the reestablishing of the holding circuits for relays R1 to R9 when subsequent impulses are received. When relay Ku becomes deenergized, relay R21 becomes energized and prepares the accumulator order for the next impulse by closing its R21b contacts.

The foregoing description has shown how a digit representation of "1" to "9" may be entered into the accumulator, and also how, after relays R1 to R9 are energized, the next impulse causes the energization of relay R10, this relay in turn being maintained energized while the accumulator relays R1 to 9 were restored to normal in preparation for new entries in the accumulator.

Whereas the entry of a value into the units order of the accumulator has been described, it would be simply repetition to describe the same for the tens, hundreds and higher orders; that is, adding control circuits from line 34 to 71, associated with the tens, hundreds, and higher orders would also be completed during the cycle according to value designations on the record card and effect impulse entries in a manner similar to that already described.

When an entry of 18 or more impulses occurs during an entry cycle relay R10 will be energized at the completion of the tenth impulse. The eleventh impulse will energize relay coil R1, the twelfth impulse will energize relay coil R2, etc. The holding circuit for relay R10 is held closed until the end of the eighteenth impulse when contacts R18d open. At the beginning of the eighteenth impulse relay R18 is picked up and contacts R18c opened and contacts R18a and R18d closed. Contacts R18a which when closed pick up relay R8, and contacts R18d are so adjusted that contacts R18d close before contacts R18a. Hence, contacts R8d' remain closed and maintain the holding circuit for relay R10 while contacts R18c are opened and until contacts R18d are closed to establish a branch circuit path in the holding circuit for relay R10. As contacts R8d' open with the energizing of relay R8, the holding circuit for relay R10 is then maintained solely through contacts R18d until the end of the eighteenth impulse when relay R18 is dropped out and contacts R18d opened thereby to break the holding circuit for relay R10. Subsequently, contacts R18c reclose and reestablish a circuit which may be utilized to maintain relay R10 energized when it is again picked up. If the accumulator receives a total of 24 impulses during an adding cycle relay R10 will be energized twice and at the completion of entry, relays R4 and R10 will be energized. Near the end of the cycle cam contacts L30 (Fig. 2e) momentarily close to energize relay coil 230. Contacts 230au open and deenergize relay coil R10. Relay R10 may be termed the carry indicating relay and is energized every time during a cycle that the accumulator passes from "9" to "0."

Carry mechanism

As is customary in accumulators of the type disclosed it is necessary to enter 1 into a denominational order when the next lower order passes from "9" to "0." The means provided for doing this is termed a "concurrent carry"; that is, entry into one order due to the next lower order having passed from "9" to "0" is concurrent with all other orders. If the order into which the carry entry is made is standing at "9," a passage from "9" to "0" occurs, and a carry entry is concurrently effected into the next higher order above. Such a condition would occur where, for example, the amount standing in the accumulator was "97" and "3" was the amount to be added. Here, obviously, for the correct result of "100" to be obtained, there must be a double carry, one for the units into the tens order and the other from the tens unit into the hundreds order.

In the present invention, however, the number of impulses received by one denominational order during an entry cycle may be greater than the value representing relays in that order, thus a particular order may go from "9" to "0" more than once during an entry cycle. When the accumulator order goes from "9" to "0" twice in an entry cycle then a carry of "2" must be made to the next higher order. If the next higher order is standing at "8" or "9," a carry entry must also be concurrently effected to the next higher order above. Such a condition would occur where, for example, the amount standing in the accumulator was "86" and sixteen impulses were entered into the units order. Then the units order would go through "0" twice to read "2" and "2" would be carried to the tens order making it go to "0" and "1" would be carried over to the hundreds order giving a reading of 102. When the accumulator order goes from "9" to "0" three times in an entry cycle then a carry of "3" must be made to the next higher order. If the next higher order stands at "7," "8," or "9" a carry of one must be concurrently effected to the next higher order above. Such a condition would occur where, for example, the amount standing in the accumulator were "79" and twenty-seven impulses were entered into the units order. Then the units order would go through "0" three times to read "6" and "3" would be carried into the tens order making it go to "0" and "1" would be carried over to the hundreds order giving a reading of "106."

Before describing the carry circuits in detail a brief outline will be given of their operation. In general each time an order goes from "9" to "0" a so-called "primary carry relay" is energized. Thus, if an order passes from "9" to "0" twice, two primary carry relays will be energized. The setup on the primary carry relays is subsequently transferred to the "carry relays" which directly control entry into the proper accumulator orders during the carry portion of a cycle. Various carry conditions will now be described in detail.

*Carry of one.*—The circuit arrangement to effect energization of the "primary carry relays" will now be explained. As was previously described upon the units order passing from "9" to "0," the relay R10 becomes energized. Each energization of relay R10 closes relay contacts R10c. The first time in a cycle that relay contacts R10c close, indicating a carry of one, a circuit is completed from line 34, through relay contacts R10c (Fig. 2e) upper side of relay contacts 200a, 201c, 202c, 203c, relay coil 200 and back to line 35. Relay coil 200 closes contacts 200b and completes a circuit from line 34 through contacts 230e, contacts 200b, now closed, contacts 201b in the position shown, relay coil 201 and back to line 35. Relay 200 remains energized as long as contacts R10c are closed. This is due to the fact that contacts 200a are make before break contacts and the lower side closes before the upper side opens thereby maintaining the circuit to relay 200. Relay contacts 201a close and complete a circuit from line 34, through contacts 230e, contacts 201a, relay coil U1 and back to line 35. Relay contacts U1a then close and provide a holding circuit for relay coil U1, from line 34 through contacts 230e, contacts U1a, relay coil U1 and back to line 35. Contacts 201b are "make before break" contacts such that the lower blade of these contacts closes before the upper blade opens thereby providing a holding circuit from line 34, relay contacts 230e, relay contacts 202d in the position shown, relay contacts 201b now shifted, relay coil 201 and back to line 35. Relay U1 may be termed a "primary carry relay."

It may be seen from the foregoing that a carry requirement of one will cause the "primary carry relay" U1 to be energized at the completion of the adding impulses.

*Carry of two.*—When a carry of two is required the relay contacts R10c will close twice. The first closure will effect energization of relay coil 201 as previously described. Upon the second closure of the R10c contacts, a circuit will be completed from line 34 through relay contacts R10c, relay contacts 200a in the position shown, relay contacts 201c now shifted, relay contacts 202b to relay coil 202 and back to line 35. Contacts 202b shift and being of the "make before break" type relay 202 remains energized and a holding circuit for 202 is established through contacts 203d and 230e as described before. Relay coil 201, however, has its holding circuit transferred at this time by the shifting of contacts 203d, which transfers the holding circuit back to the pickup circuit through R10c. Thus, when contacts R10c open the relay coil 201 will be deenergized. Contacts 202d are "make before break" contacts. Contacts 202a close to energize relay coil U2 by a circuit from line 34, relay contacts 230e, relay contacts 202a, "primary carry relay" U2 and back to line 35. Relay coil U2 is maintained energized by relay contacts U2a and relay contacts 230e, which extend back to line 34. Thus, it may be seen from the foregoing that a carry requirement of two will cause the relay U2 to be energized at the completion of the adding impulses.

*Carry of three.*—When a carry of three is required the relay contacts R10c will close three times. The first two closures will energize relay coils U1 and U2 as described previously. The third closure will energize relay 203 by a circuit similar to that previously traced through the 200a, 201c contacts in the position shown, the 202c contacts now shifted, through the 203b contacts, relay coil 203, and back to line 35. Contacts 203a effect energization of "primary carry relay" U3, which is maintained energized through contacts U3a, in a manner similar to U1 and U2. Contacts 203b shift and hold 203 energized. Contacts 203d shift and 202 deenergizes when R10c open. Thus, relays U1, U2 and U3 will be energized upon closure of relay contacts R10c three times to indicate a carry requirement of three during an adding cycle. Various carry conditions will now be discussed for various conditions of accumulator entry.

*Case 1 condition (a).*—If an order passes from "9" to "0" once during a cycle there should be a carry of one to the next higher order. Under this condition, entries will have been made of a number of impulses which cause the particular order to go through zero once. As an illustrative example of this condition, let us consider where the amount A is 36, B is 23, C is 17. The total of these amounts is as shown below:

```
36—A
23—B
17—C
──
66
 1 —carry
──
76
```

The units column entries will direct 16 impulses to the units order which in the manner previously described will successively energize coils R1, R2, etc., up to R10 which effects deenergization of the previous coils R1, R2, etc., and which will be successively energized again as succeeding impulses occur ending up with coils R1 through R6 energized. Energization of R10 will effect energization of U1. In the tens order, coils R1 through R6 will be energized due to the six impulse connections from entry of "3" plus "2" plus "1."

At about "12" in the cycle cam contacts L39 close (see Fig. 3). This completes a circuit to energize relay coil 231 the circuit extending from line 34 (Fig. 2e), through cam contacts L39, relay coil 231 and back to line 35. Referring now to Fig. 2f, with contacts 231ub closed and contacts U1e closed, a circuit is completed from line 34, through relay contacts 231a, relay contacts U1e, relay contacts 231ub, relay coil TA and back to line 35. Relay coil TA which may be termed a "carry relay" is maintained energized through relay contacts TAa and relay contacts 230h which extend back to line side 34. Shortly thereafter, at what may be termed the carry part of a cycle a circuit is completed from line 34, through circuit breaker contacts 91A (Fig. 2e), line 72A (see also Fig. 2d), contacts TAb and through the tens order of its accumulator thus effecting an entry of "1" to this order. When cam contacts L38 close slightly later (Fig. 2e) relay coil 230 is energized. Contacts 230h (Fig. 2f) open to deenergize TA. Simultaneously, contacts 230ua (Fig. 2e) open to deenergize R10. Relay contacts R230e open to deenergize relay coil U1. The accumulator is now ready for the entry from the next card.

*Case 1 condition (b).*—If an order passes from "9" to "0" twice there should be a carry of "2" to the next higher order as an illustrative example, consider an example where the number "14" is standing in the accumulator and entries are as shown below.

```
14—in accumulator
29—A
16—B
13—C
──
52
 2 —carry
──
72
```

For this example, the units order of the accumulator will pass through zero twice causing R10 to energize twice and effect pickup of U1 and U2. Relay contacts U1e points effect energization of "carry relay" TA described above. Relay contacts U2c close and when relay contacts 231uc and 231a close, a circuit will be completed to energize "carry relay" TB as follows: from line 34, relay contacts 231a, relay contacts U2c, relay contacts 231uc, relay coil TB, and back to line 35.

Relay contacts TA*b* (Fig. 2*d*) close and direct an entry into the tens order of the accumulator under control of circuit breaker contacts 91A, as previously described. Relay contacts TB*b* (Fig. 2*d*) upon closing complete another circuit from line 34, (Fig. 2*e*) through cam contacts 91B, relay contacts TB*b* (Fig. 2*d*) now closed, to line 71 in the tens order of the accumulator (Fig. 2*d*).

These two entries increase the amount already standing in the tens order of the accumulator from "5" to "7" giving a final result of "72."

*Case 1 condition (c).*—If an order passes from "9" to "0" three times there should be a carry of 3 to the next higher order. Consider the example shown below:

```
17—in accumulator
28—A
19—B
18—C
—
52
 3 —carry
—
82
```

For the above condition, the units order will go through zero three times energizing relay coils U1, U2, and U3. Relay coils U1 and U2 will energize TA and TB. Relay contacts U3*b* close and upon energization of 231, a circuit is completed from line 34, Fig. 2*f*, through relay contacts 231*a*, relay contacts U3*b*, relay contacts 231*ud*, through relay coil TC, and back to line 35. Closure of contacts TC*b* completes a circuit for entry of one from line 34 (Fig. 2*e*) cam contacts 91C, line 72C (see also Fig. 2*d*), relay contacts TC*b*, to line 71. Single entries of one are also made under control of TA and TB. These three entries increase the amount already standing in the tens order from "5" to "8" giving a final result of "82."

*Case 2.*—If an order stands at "9" and receives a carry of "1," "2," or "3" from the next lower order, the next higher order should receive a carry of 1 if the order bearing 9 has not passed through 0 during the entry portion of the cycle Consider the following examples:

```
1.      128—in accumulator
        035—A
        232—B
        311—C
        ——
        696
         11 —carry
        ——
        706

2.      128—in accumulator
        039—A
        238—B
        311—C
        ——
        696
         12 —carry
        ——
        716

3.      129
        039
        239
        319
        ——
        696
         13
        ——
        726
```

In 1 the units order passes through zero once, energizing relays U1 and TA. In 2 the units order passes through zero twice, energizing relays U1, U2, TA and TB. In 3 the units order passes through zero three times, energizing relays U1, U2, U3, TA, TB, and TC. In 1 at the time TA is energized, a parallel circuit will be completed through relay contacts 231*ue*, relay contacts R9*e*, of the tens order now closed, relay contacts T1*d*, in the position shown, relay coil HA and back to line 35. Relay coil HA closes its contacts HA*b* Fig. 2*c*), to effect a single entry into the hundreds order during carry operations under control of circuit breaker 91A. TA being energized will effect entry to the tens order of "1" in the usual way.

In 2 and 3, relay coil HA will be energized in the same manner as 1 to effect carry of "1" to the hundreds order.

From an examination of Fig. 2*f*, it is noted that a conventional dry-plate rectifier RE is connected in the circuit wire connecting contacts R8*e* of the tens order and T1*c* and a similar rectifier RE in the circuit wire connecting contacts R7*e* of the tens order and T1*b*. As relays R8 and R7 of the tens order are also energized when relay R9 of that order is energized, these rectifiers RE prevent flow of current through their contacts R8*e* and R7*e* in directions to energize relays TB and TC at the time that current flows through the just described energizing circuit for relay HA. However, as is well known the rectifiers RE permit flow of current through their respective circuit wires in the opposite direction when circuits hereinafter described are completed. As shown, rectifiers RE are also connected for the same purpose in corresponding circuit wires in the hundreds order.

*Case 3.*—If an order stands at "9," and receives a carry of "1," "2," or "3" from the next lower order and the order bearing "9" has passed through zero once the next higher order should receive a carry of 2. Consider the following examples:

```
1.      178—in accumulator
        065—A
        252—B
        311—C
        ——
        696
         21 —carry
        ——
        806

2.      178—in accumulator
        065—A
        252—B
        319—C
        ——
        694
         22 —carry
        ——
        814

3.      178—in accumulator
        068—A
        259—B
        319—C
        ——
        694
         23 —carry
        ——
        824
```

In 1 the units order passes through zero once energizing relays U1 and TA. In 2 the units order passes through zero twice energizing relays U1, U2, TA, and TB. In 3 the units order passes through zero three times energizing relays U1, U2, U3, TA, TB, and TC. The tens order in all cases goes through zero once to energize relay coils T1 and HA. Relay coil HA is energized under control of contacts T1e in the same manner as contacts U1e controlled energization of relay coil TA. With relays T1 and TA energized a parallel circuit is completed from TA, through contacts 231ue, contacts R9e, now closed, relay contacts T1d, now shifted, relay contacts T2b in the position shown, relay coil HB and back to line 35. When carry occurs relay coils TA will effect entry of "1" to the tens order for case 1. Relay coils TA and TB will effect an entry of "2" to the tens order for case 2. Relay coils TA, TB and TC will effect an entry of "3" to the tens order for case 3. Relay coil HA will effect an entry of "1" to the hundreds order under control of circuit breaker 91A (Fig. 2e) via circuit on line 72A (see also Fig. 2d) through contacts HAb (Fig. 2c). Relay coil HB will effect the second carry entry of "1" by breaker 91B (Fig. 2e) line 72B (Figs. 2b, 2c) through contacts HBb to the hundreds order.

*Case 4.*—If an order stands at "8" and receives a carry of "2" or "3" from the next lower order, then the next higher order should receive "1" if the order bearing "8" has not passed through zero. Consider the examples:

1.
```
024—in accumulator
149—A
516—B
213—C
───
882
12 —carry
───
902
```

2.
```
028—in accumulator
149—A
516—B
219—C
───
882
13 —carry
───
912
```

The passage of the units order through zero twice in 1 energizes relays U1 and U2 or three times in 2 energizes relays U1, U2, and U3 to cause relays TA, TB for 1 or relays TA, TB, and TC for 2 to be energized. With TB energized a parallel circuit is completed to energize HA as follows: from TB through relay contacts 231uf, relay contacts R8e of the tens order, now closed, rectifier RE, relay contacts T1c in the position shown, relay coil HA and back to line 35. Relay coils TA, TB and HA being energized will effect entry of "2" to the tens order of 1 and "1" in the hundreds order. Coil TC being energized for 2 will effect an additional carry of "1" to the tens order making a total carry entry of "3."

*Case 5.*—If an order stands at 7 and receives a carry of 3 from the next lower order, then the next higher order should receive 1, if the order bearing 7 has not passed through zero. Consider the example:

```
029—in accumulator
149—A
516—B
207—C
───
871
13 —carry
───
901
```

The units order in passing through zero three times will energize relay coils U1, U2 and U3, which in the usual way causes relay coils TA, TB and TC to be energized. With the tens order standing at seven a parallel circuit extends from relay coil TC through relay contacts 231ug, relay contacts R7e, now closed, rectifier RE, relay contacts T1b in the position shown, relay coil HA and back to line 35. Relay contacts HAb (Fig. 2c) upon closing control a carry of "1" to the hundreds order in the usual manner.

*Case 5 (a).*—If an order stands at "8," and receives a carry of "2" or "3" from the next lower order, then the next higher order should receive a carry of "2" if the middle order has passed from 9 to 0 once.

1.
```
197—in accumulator
235—A
126—B
348—C
───
786
22 —carry
───
906
```

2.
```
199—in accumulator
238—A
128—B
349—C
───
784
23 —carry
───
914
```

In condition 1 the passage of the units order through zero twice will energize relays U1, U2 which in turn energizes relays TA and TB. Passage of the tens order through zero once will energize relay T1 which effects energization of relay coil HA. With the tens order standing at "8" there is a parallel circuit from TB through contacts 231uf, relay contacts R8e, rectifier RE, relay contacts T1c, now shifted, relay contacts T2b, in the position shown, relay coil HB, and back to line 35. Relay coil HB, closes its contacts HBb (Fig. 2c) which in conjunction with contacts HAb will effect carry entry of "2" in the hundreds order for problem 1. In problem 2, the additional passage of the units order through zero will energize relay TC also to control a total carry entry of "3" into the tens order.

*Case 6.*—If an order stands at "7" and receives a carry of "3" from the next lower order then the next higher order should receive a carry of "2" if the middle order has passed through zero once. Consider the example.

```
189—in accumulator
238—A
128—B
349—C
───
774
23 —carry
───
904
```

Passage of the units order through zero three times will energize relays TA, TB, and TC in the usual manner. Passage of the tens order through zero once will energize HA. With the tens order standing at seven a parallel circuit is completed from TC through relay contacts 231ug, relay contacts R7e, rectifier RE, contacts T1b, now shifted (due to the passage of the tens order through zero) relay contacts T2b, in the position shown, relay coil HB and back to line 35.

Carrys as illustrated for the problem will be effected by these relays in the usual manner.

*Case 7.*—If an order stands at 9, and has passed through zero twice and receives a carry of "1," "2," or "3" from the next lower order, then the next higher order should receive a carry of "3." Consider the examples:

1.
```
178—in accumulator
095—A
292—B
341—C
---
696
31 —carry
---
906
```

2.
```
178—in accumulator
095—A
299—B
343—C
---
695
32 —carry
---
915
```

3.
```
179—in accumulator
096—A
299—B
347—C
---
691
33 —carry
---
921
```

Passage of the units order through zero will energize one or more of relays TA, TB, and TC depending on whether the order goes through zero once, twice, or three times. The passage of the tens order through zero twice will energize relays T1, T2, HA, and HB. With the tens order standing at "9" a parallel circuit is completed from relay coil TA, through relay contacts 231ue, relay contacts R9e, relay contacts T1d, now shifted, relay contacts T2b, now shifted, relay coil HC and back to line 35. With relays HA, HB, and HC energized there will be the usual entry of two "1's" when carry is effected under control of HA and HB and relay coil HC will effect entry of the third "1" for carry by a circuit from line 34, circuit breaker 91C (Fig. 2e) line 72C (Figs. 2d and 2c), relay contacts HCb, to the hundreds order of the accumulator.

*Case 8.*—If an order stands at 8 and has passed through zero twice, and receives a carry of "2" or "3" from the next lower order, then the next higher order should receive a carry of 3. Consider the following examples:

1.
```
178—in accumulator
095—A
289—B
343—C
---
685
32 —carry
---
905
```

2.
```
179—in accumulator
096—A
289—B
347—C
---
681
33 —carry
---
911
```

Passage of the accumulator through zero two or three times in the units order will energize relays TA and TB or TA, TB and TC respectively. With the tens order having passed through zero twice, relays T1, T2, HA and HB will be energized. With the accumulator standing at eight in the tens order relay coil R8 of that order will be energized and a parallel circuit will be completed from TB, through relay contacts 231uf, relay contacts R8e, now closed, rectifier RE, relay contacts T1c, now shifted, relay contacts T2b, now shifted, relay HC and back to line 35. With the various relays above indicated the proper carry entries will be effected as previously described for other problems.

*Case 9.*—If an order stands at "7" and has passed through zero twice and receives a carry of "3" from the next lower order, then the next higher order should receive a carry of 3. Consider the following example:

```
179—in accumulator
096—A
279—B
347—C
---
671
33 —carry
---
901
```

The units order in passing through zero three times will energize TA, TB and TC. The tens order in passing through zero twice will energize T1, T2, HA, and HB. With the tens order standing at seven relay coil R7 will be energized and a parallel circuit to energize relay HC will extend from TC, through relay contacts 231ug, relay contacts R7e, now closed, rectifier RE, relay contacts T1b and T2b both in shifted relation, to and through relay coil HC and back to line 35. Relay coils TA, TB, TC, and HA, HB, HC will effect carry entries of "3" into the tens and hundreds orders respectively.

*Case 10.*—If an order has gone through zero once, next two orders stand at "9" and the last order has gone through zero once. Consider the example:

```
791—in accumulator
200—A
109—B
901—C
---
991
211 —carry
---
2001
```

Passage of the units order through zero once will energize relays U1 and TA. Passage of the hundreds order through zero once will energize relay THA under control of relay H1 in the same manner as relay U1 controls energization of relay TA. Circuits to energize relay coils THB and HA will now be traced. A parallel circuit extends from relay TA, through relay contacts 231ue, relay contacts R9e, relay contacts T1d, in the position shown, relay coil HA and back to line 35. The circuit also extends from relay coil HA, relay contacts 231*te*, relay contacts R9*e* of the hundreds order, now closed, relay contacts H1*d* now shifted, relay contacts H2*b*, in the position shown, relay coil THB and back to line 35. Relay coils THA and THB effect entry of two "1's" during carry to the thousands order. This occurs in the usual way as described previously with reference to lower orders.

*Case 11.*—If an order has gone through zero two or three times and the next two orders stand at "8" and each one has gone through zero once. Consider the following examples:

1.
```
    189—in accumulator
    815—A
    456—B
    546—C
    ---
    886
    222 —carry
    ---
    2006
```

2.
```
    189—in accumulator
    819—A
    458—B
    548—C
    ---
    884
    223 —carry
    ---
    2014
```

Passage of the units order through zero two or three times will energize relays TA, TB, or TA, TB and TC, respectively. Passage of the tens and hundreds orders through zero once will energize relays T1, HA, H1, and THA. With the tens and hundreds orders having eight therein, relay coils R8 in the tens and hundreds orders will be energized. Circuits to energize HB and THB will be completed as follows: from relay coil TB, relay contacts 231*uf*, now closed, relay contacts R8*e*, now closed, rectifier RE, relay contacts T1*c*, now shifted, relay contacts T2*b* in the position shown, relay coil HB and back to line 35. A parallel circuit extends from HB through relay contacts 231*tf*, relay contacts R8*e*, of the hundreds order, rectifier RE, relay contacts H1*c* shifted, relay contacts H2*b* in the position shown, relay coil THB and back to line 35. The various carry entries will now be effected in a manner which will be understood, under control of relays TA, TB, or TA, TB, TC, and HA, HB, THA, THB as previously described.

*Case 12.*—If an order has gone through zero three times and the next two higher orders stand at 7 having gone through zero twice. Consider the example:

```
    789—in accumulator
    879—A
    458—B
    878—C
    ---
    774
    333 —carry
    ---
    3004
```

The units order in going through zero three times will energize relays U1, U2, U3, TA, TB, and TC. The tens and hundreds orders in going through zero twice will cause relays T1, T2, HA, HB, H1, H2, THA and THB to be energized. With the tens and hundreds orders having "7" therein relay R7 in each of these orders will be energized, a circuit will be completed from TC, through relay contacts 231*ug*, relay contacts R7*e*, of tens order, rectifier RE, relay contacts T1*b* and T2*b* shifted to relay coil HC and back to line 35, a further circuit extends from relay HC, through contacts 231*tg*, of the hundreds order, relay contacts R7*e* of hundreds order, rectifier RE, contacts H1*b* and H2*b*, shifted, relay THC and back to line 35. The various carry entries will be effected in the usual manner.

Various other conditions will be met with as entries are being made, but it is believed that from an understanding of cases 1 through 12 the circuit connections for other conditions can be traced out.

Subtraction may be performed by this accumulator and may be controlled for this purpose in various ways, one of which is the so-called "X" selection method which has already been briefly described. The "X" position on the record cards is the next index point after the "0" position and is analyzed at the 11th cycle point in the card feed cycle. For detailed explanation to "X" selection control from record cards, reference should be made to the previously mentioned U. S. Patent No. 1,976,617. It will, of course, be understood that the accumulator may be arranged to subtract every amount entered therein, but the "X" selection method is suggested as a demonstration of greater flexibility of application in regard to modern electrical accounting machines and the work which these machines are called upon to perform.

Consider now an example where all fields are to be subtracted that have an "X" perforation in their corresponding "X" control column such as shown in column A' (Fig. 4). When an upper brush senses the "X" designation on the card, a circuit is established to control the accumulator for subtractive entry during the following cycle as that same card passes the lower brushes. To provide for sensing the "X" designation a plug connection is established from the brush plug hub 21 (Fig. 2) of the upper brushes which sense column A' to plug socket 94A (Fig. 2a). A similar connection for columns B' and C' is made to plug sockets 94B and 94C. Consider now the passage of a card having an "X" designation in the column A' past the brushes UB. A circuit is established from line 34, wires 64 and 65, cam contacts L11, upper brush contact roll 16, value designation "X" on the card, upper brush UB in the corresponding column, plug hub 21, plug wire connection to plug hub 94A (Fig. 2a) cam contacts L23A closed at the "X" index time, contacts UCL*d* now closed, relay coil 95A to line 35. Relay 95A is thus energized and the 95A*a* and 95A*b* contacts will close; the former providing a holding circuit through cam contacts L25 back to line 34 and the latter causing relay coil 97A to become energized when cam contacts L37 close by the following circuit: line 34, cam contacts L25, now closed, cam contacts L37 now closed, contacts 95A*b*, relay coil 97A, to line 35. Cam contacts L15 and relay contacts 97A*c* will hold relay 97A energized from the time relay 95A becomes deenergized in one cycle until past the adding portion of the next cycle.

With relay 97 energized, relay contacts 97A*d* (Fig. 2e) close to establish an entry circuit to the accumulator from line 34, circuit breaker contacts 91A, line 72A, relay contacts 97A*d* closed, relay contacts 77Ac in the position shown, into the accumulator and then to line 35. Breaker contacts 91A send a succession of impulses over this circuit commencing at the beginning of the subtraction cycle. Each impulse energizes one further value relay in each of the denominational orders of the accumulator which are plugged for entry. When a value designation in the card is encountered by a lower brush in the corresponding column, the feeding of impulses into the accumulator order to which this column is plugged is abruptly halted because the adding control magnet 77A associated with that order becomes energized, thereby opening contacts 77Ac to break the entry circuit. The making time of breaker contacts 91A is slightly delayed as compared with breaker contacts 61 (Fig. 3). This condition is required so that when a value designation is encountered, the entry circuit to the corresponding order of the accumulator may be broken before another subtractive impulse is entered into the accumulator. Also, under the condition in which "9" is being subtracted, it is necessary to prevent any impulses from entering the accumulator.

By the above circuits, then, if "5" was the value to be subtractively entered into one order of the accumulator breaker contacts 91A would send out an impulse slightly after each of the cycle points "9," "8," "7," and "6." Then at "5" in the cycle upon sensing of the "5" designation of the card in the corresponding column, adding control magnet 77A becomes energized as explained above to break the entry circuit by opening its contacts 77Ac. At this time four impulses have actually been entered in this order. Thus, instead of actually subtracting "5," the same result has been accomplished by the entry of the number of impulses representing its nines complement. In the units position an extra impulse is necessary because the complements in this position must add up to ten. This extra impulse, known as "the elusive one" is provided in a manner to be described presently.

Subtraction occurs in all orders concurrently and in a similar manner, and the final result is obtained following the carry time in the cycle. It is during this time that the so-called "elusive one" is entered into the units order. The "elusive one" circuit becomes effective only in the cycle following the energization of relay 97A. This circuit may be traced as follows: line 34, wires 26 and 27 (Fig. 2a), cam contacts L35, now closed, contacts 97Af now closed, relay coil 86A, to line 35. Coil 86A is maintained energized until after the carry operation in this same cycle by a circuit from line 34, wires 26 and 27, cam contacts L36, now closed, contacts 86Aa, now closed, coil 86A, to line 35. With relay contacts 86Ab closed, then upon closure of relay contacts 231b a circuit is completed from line 34 (Fig. 2f), relay contacts 231a, now closed, relay contacts 86Ab, relay contacts 231b, through relay coil UA and back to line 35. Relay coil UA closes its contacts UAa to provide a holding circuit through relay contacts 230h. Relay contacts UAb (Fig. 2e) close to provide an "elusive one" entry circuit from line 34, through circuit breaker 91A, line 72A, relay contacts UAb, into the units order of the accumulator and back to line 35.

If a card passes the upper brushes bearing an "X" perforation in fields B' and C', for example, the relay coils 95B and 95C in turn effect energization of relay coils 97B and 97C in the same manner as relay coil 95A effects energization of relay coil 97A.

Contacts of relay coils 97B and 97C will cause energization of relay coils 86B and 86C in the manner previously described for relay coil 86A. Relay contacts 86Bb and 86Cb (Fig. 2f) effect energization of relay coils UB and UC in the same manner as relay contacts 86Ab effected pick up of relay coil UA. Contacts UBb and UCb will effect entry of the "elusive one" to the units order under control of circuit breakers 91B and 91C.

It may be mentioned further that the carry control circuits (Fig. 2f) function for carry in the same manner for the units order and "elusive one" entry as for higher order. For example, if the units order stands at "9" and receives an "elusive one" entry then when UA is energized a parallel circuit will extend through relay contacts R9e, and U1d, if the units order has not passed from "9" through "0," to energize relay coil TA and effect carry in the usual manner. When the latter condition takes place, dry-plate rectifiers RE prevent back flow of current through contacts R8e and R7e of the units order and thereby prevent the energizing of relays UB and UC, in the same manner as the rectifiers RE in the tens and hundreds orders previously described.

Since the various carry conditions have been described previously and similar principles apply to the units order with "elusive one" entry as to the higher orders it is believed unnecessary to describe this portion of the carry mechanism in greater detail.

*Total printing circuits*

Total printing of amounts standing in the accumulator is provided and is under the control of relay 74, total print emitter 93, and readout contacts associated with each of the value relays. The circuits are so arranged that readout is effected from the last operated relay in each denominational order of the accumulator. Totals are printed during a reset cycle which, as previously described, may be initiated manually by the depression of the reset key to close contacts R, or, if the machine is preset accordingly, totals may be taken automatically after the feed has been halted at the end of a group of cards.

A total switch 78 (Fig. 2a) is provided and is manually settable in one of two positions; an "off" position which is the position shown in the diagram (Fig. 2a) or a "total" position in which brushes 80 bridge contacts 82 and brushes 79 bridge contacts 88. In order to complete circuits to print magnets 87 it is necessary to energize multi-contact relay magnet 74, and to effect the energization of this relay it is necessary to set switch 78 to the "total" position to complete a circuit as follows: line 35, relay magnet 74, contacts 84a, contacts 82, brush 80, cam contacts P6, now closed, wire 26 to line 34. With magnet 74 energized, contacts 74b (Fig. 2) close and circuits may be completed to print magnets 87 as follows: line 34, print magnet 87, contacts 74b now closed, through normal readout contacts R9g, R8g, R7g, etc., to the shifted readout contacts of the last operated value relay in the order, emitter 93, circuit breaker contacts 58 (Fig. 2a), to line 35. That is, for example, if "6" is the value standing in the units order of the accumulator as represented by the fact that relay R6 is the last operated relay in that order, readout contacts R9g, R8g, and R7g are closed as shown, but the readout contacts associated with relay R6 are shifted so that contacts R6g are open and contacts R6f are closed. This permits a readout circuit at the "6" time in the total cycle from line 34, print magnet 87, contacts 74b, now closed, contacts R5g, R8g, and R7g, contacts R6f, now closed, emitter 93, circuit breaker contacts 58, to line 35.

A simple electrical resetting means is provided for clearing the accumulator. On the reset cycle, relay magnet 50 is energized, as has been already explained under the heading of "General machine circuits" so that contacts 50a are closed, and, with switch 78 set to its "total" position a circuit is completed to energize relay 81 as follows: line 35, contacts 50a, now closed, relay coil 81, contacts 88, and brushes 79 of switch 78, conductor 26, to line 34. The energization of relay coil 81 causes contacts 81a to open (Fig. 2e) and remain open during the reset cycle. These contacts are in the circuit which maintains all the value relays energized. When contacts 81a open, however, the value relays are not deenergized immediately because cam contacts P12 shunt these contacts until a point later in the cycle after the totals have been read out. When contacts P12 open all the accumulator relays are instantaneously deenergized, thus clearing the accumulator of old totals standing therein and reconditioning the same for new entries so that new totals may be ascertained. It will be noted that the actual resetting of the accumulator is accomplished entirely by electrical means and none of the customary mechanical resetting structure is required.

Summary of operation

It has been shown that the accumulator comprises a plurality of orders, each of which has for its structure a series of sets of companion relays and interconnecting circuits. Multiple timed impulses are fed into the accumulator and successively energize a plurality of relays therein. On adding, the number of impulses entered in any one order is equal to the value of the sum of digits represented by these impulses. On subtracting, a complementary number of impulses are automatically entered to energize successively further relays in the series. Each impulse entered into an order causes the energization of any entry control relay which in turn effects the energization of its companion value relay. When any order passes from "9" to "0," relays representing the digits "1" to "9" become concurrently and automatically deenergized. Electrical carry means is provided so that, upon one order passing from "9" to "0," a carry impulse is entered into the next higher order. Total taking means is provided and consists of additional contacts controlled by the value relays, and an emitter for imparting impulses to the print magnets at a differential time in the total cycle. Resetting means for the accumulator consists of contacts which open during the resetting cycle and break the holding circuits to all accumulator relays, thereby clearing the accumulator of totals that were standing therein.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. An accounting machine comprising a multi-denominational order accumulator of the stepping type for receiving numerical value entries in successive steps; means for concurrently sensing designations in a plurality of fields representing, respectively, multidenominational amounts; impulsing means for transmitting to the accumulator a series of successive impulses to effect corresponding value entries in the accumulator; means controlled by said sensing means for effecting operation of said impulsing means to transmit to each particular order a number of impulses equal to the sum of the value entries in that particular order in the several fields; carry mechanism including a carry storing device between each pair of successive orders for retaining a carry indication, means controlled by the accumulator for actuating a carry storing device each time the lower of its pair of successive orders receives a predetermined number of impulses, and means controlled by each carry storing device for transmitting concurrently to the higher of its pair of successive orders a number of impulses equal to the number of times such storing device was previously actuated; and said carry mechanism also including a carry detecting means for each order of the accumulator, except the highest, and each said carry detecting means being controlled by its related order and providing in conjunction with said carry storing devices for transmitting a stepping impulse to an order higher than said related order when such related order is to receive a number of carry impulses which would bring the total number of impulses received therein to a value greater than said predetermined number of impulses.

2. In an accounting machine, means for sensing concurrently designations representing digit values composing two separate amounts; an accumulator capable of being advanced one step each time an impulse is received thereby; a first emitting means operable to emit a first series of impulses in a definite timed order; a second emitting means operable concurrently with said first emitting means to emit a second series of impulses also in a definite timed order which is out of phase with respect to the timed order of said first series of impulses; and control means acting in response to said sensing means and operable to select and send to said accumulator a number of said first series of impulses corresponding to the digit values of one of said two amounts and concurrently therewith to select and send to said accumulator a number of said second series of impulses corresponding to the digit values of the other of said two amounts.

3. In an accounting machine, means for sensing concurrently designations representing digit values composing two separate multi-denominational amounts; a multidenominational order accumulator of the stepping type capable of being advanced one step each time an impulse is received thereby; impulsing means for transmitting concurrently to the accumulator a first and a second series of successive impulses to effect corresponding digit value entries in the accumulator with the timing of the first series being out of phase with respect to the timing of the second series; and means acting in response to said sensing means for rendering said impulsing means effective to transmit to said accumulator a number of said first series of impulses to provide for entering one of said two amounts and concurrently therewith to transmit to said accumulator a number of said second series of impulses to provide for entering the other of said two amounts and in such a manner that each order of the accumulator receives a number of impulses equal to the sum of the digit values in that particular order in the two amounts.

4. In a cyclically operable accounting machine, the combination of means operable during each cycle for concurrently analyzing designations on a record representing digit values composing two separate numbers; a multidenominational order relay accumulator operable to receive digit entries in the several orders and each order being composed of a plurality of relays capable of being operated progressively in steps to represent, respectively, the digits 0-9; means for entering numbers in said accumulator by effecting in each order progressive steps of operation corresponding in number to the digit value entered in such order; and means responsive to said analyzing means and controlling the operation of said entering means to provide during each cycle of operation for operating progressively the relays of each order a number of steps equal to the sum of the digits in the corresponding order in said two numbers on the record analyzed.

5. In a cyclically operable accounting machine, the combination of means operable during each cycle for concurrently analyzing designations on a record representing digit values composing two separate numbers; a multidenominational order accumulator operable to receive digit entries in the several orders and each order being composed of a plurality of elements capable of being operated progressively in steps to represent, respectively, the digits 0-9; means for entering numbers in said accumulator by effecting in each order progressive steps of operation corresponding in number to the digit value entered in such order; means responsive to said analyzing means and controlling the operation of said entering means to provide during an entry portion of each cycle for operating progressively the elements of each order a number of steps equal to the sum of the digits in the corresponding order in said two numbers on the record analyzed; and carry mechanism including carry storing means between each pair of successive orders for retaining carry indications, means operable with the effecting of the operating step corresponding to the digit 0 of a lower order, for storing a carry indication in that storing means which is between such lower order and the next higher order, each time such operating step is effected during the entry portion of a cycle, and means operable during a carry portion of each cycle, occurring after the entry portion of such cycle, for effecting progressive steps of operation of the elements of each higher order a number of times equal to the number of carry indications stored in the storing means between such higher order and the next lower order.

6. In a cyclically operable accounting machine, the combination of means operable during each cycle for concurrently analyzing designations on a record representing digit values composing two separate numbers; a multidenominational order accumulator operable to receive digit entries in each order thereof; means responsive to said analyzing means and operable during an entry portion of a cycle, for advancing each order of the accumulator an amount equal to the sum of the digits in the corresponding order in said two numbers; and carry mechanism including carry storing means between each pair of successive orders for retaining carry indications, means operable during the entry portion of each cycle and each time the digit entries received by the lower order of each pair exceeds the highest number representable by such lower order, for storing a carry indication in that storing means which is between such lower order and the next higher order, and means operable during a carry portion of each cycle, occurring after the entry portion of such cycle, for effecting digit entries in the higher order of each pair equal to the number of carry indications stored in the storing means between such higher order and the next lower order.

7. In a cyclically operable accounting machine, the combination of means operable during each cycle for concurrently analyzing designations on a record representing digit values composing two separate numbers; a multi-denominational order accumulator operable to receive digit entries in each order thereof; means responsive to said analyzing means and operable during an entry portion of a cycle, for advancing each order of the accumulator an amount equal to the sum of the digits in the corresponding order in said two numbers; and carry mechanism including carry storing means between each pair of successive orders for retaining carry indications, means operable during the entry portion of each cycle and each time the digit entries received by the lower order of each pair exceeds the highest number representable by such lower order, for storing a carry indication in that storing means which is between such lower order and the next higher order, and means operable during a carry portion of each cycle, occurring after the entry portion of such cycle, for effecting digit entries in the higher order of each pair equal to the number of carry indications stored in the storing means between such higher order and the next lower order; and said carry mechanism including carry detecting means controlled by the lower order of each pair of successive orders and operable during said carry portion of each cycle to advance the next higher order one unit of digit value when the number of carry digit entries to be received by such lower order added to the value already represented in such lower order exceeds the highest number representable by such lower order.

8. In a cyclically operable accounting machine, the combination of means operable during each cycle for concurrently analyzing designations on a record representing digit values composing two separate numbers; a multi-denominational order accumulator of the stepping type, each order of which is advanced one step each time an impulse is received thereby; emitting means operable during an entry portion of each cycle to emit a first series of separate impulses equal in number to the highest digit value representable by an order and operable concurrently therewith to emit a second series of separate impulses also equal in number to the highest digit value representable by an order with the impulses of one series alternating with respect to the impulses of the other series; and control means responsive to said analyzing means and operable during said entry period to select and transmit to each order of the accumulator a number of said first series of impulses from said emitting means equal to the digit value in the corresponding order of one of said two numbers and operable concurrently therewith to select and transmit to each order of the accumulator a number of said second series of impulses from said emitting means equal to the digit value in the corresponding order of the other of said two numbers.

9. In an accounting machine, the combination of an accumulator responsive to electrical impulses and operable to advance one digit for each electrical impulse transmitted thereto; emitting means operable to emit concurrently a first and a second series of digit-entering electrical impulses with the impulses of one series alternating with respect to the impulses of the other series; and entry control means for concurrently transmitting to the accumulator, for advancing the latter, a selected number of impulses of said first series representing, respectively, the digits of one number and a selected number of impulses of said second series representing, respectively, the digits of a second number, whereby two numbers may be concurrently entered in said accumulator.

10. In a cyclically operable accounting machine, the combination of means operated during a single machine cycle for analyzing designations on a record representing digit values forming one number and operated concurrently therewith during the same cycle and as a part of the same analyzing operation, for analyzing designations on the same record representing digit values forming a second number; a multi-denominational order accumulator of the stepping type, each order of which is advanced one step each time an impulse is received thereby and each step advanced corresponding to a unit of digit value entered therein; means providing for a plurality of separate impulses for advancing the accumulator orders; and means responsive to said analyzing means for rendering said impulsing means effective to transmit during said cycle to each order of the accumulator a number of advancing impulses equal to the sum of the digit values in the corresponding order of said two numbers.

11. In a cyclically operable accounting machine, the combination of means operated during a single machine cycle for analyzing designations on a record representing digit values forming one number and operated concurrently therewith during the same cycle and as a part of the same analyzing operation, for analyzing designations on the same record representing digit values forming a second number; a multi-denominational order accumulator of the stepping type, each order of which is advanced one step each time an impulse is received thereby and each step advanced corresponding to a unit of digit value entered therein; means providing for a plurality of separate impulses for advancing the accumulator orders; means responsive to said analyzing means for rendering said impulsing means effective, during an entry portion of said machine cycle, to transmit to each order of the accumulator a number of advancing impulses equal to the sum of the digit values in the corresponding order of said two numbers; and carry mechanism including carrying storing means between each pair of successive orders for retaining carry indications, means operable during the entry portion of said cycle and each time the digit entries received by the lower order of each pair exceeds the highest number representable by such lower order, for storing a carry indication in that storing means which is between such lower order and the next higher order, and means operable during a carry portion of said cycle, occurring after the entry portion of such cycle, for effecting digit entries in the higher order of each pair equal to the number of carry indications stored in the storing means between such higher order and the next lower order.

ROBERT T. BLAKELY.